(12) United States Patent
Votaw et al.

(10) Patent No.: US 10,057,255 B2
(45) Date of Patent: Aug. 21, 2018

(54) PREVENTING UNAUTHORIZED ACCESS TO SECURED INFORMATION SYSTEMS USING MULTI-DEVICE AUTHENTICATION TECHNIQUES

(71) Applicant: Bank of America Corporation, Charlotte, NC (US)

(72) Inventors: Elizabeth S. Votaw, Potomac, MD (US); Andrew T. Keys, Albany, OR (US)

(73) Assignee: Bank of America Corporation, Charlotte, NC (US)

( * ) Notice: Subject to any disclaimer, the term of this patent is extended or adjusted under 35 U.S.C. 154(b) by 54 days.

(21) Appl. No.: 15/214,795

(22) Filed: Jul. 20, 2016

(65) Prior Publication Data

US 2018/0026970 A1 Jan. 25, 2018

(51) Int. Cl.
*H04L 29/06* (2006.01)

(52) U.S. Cl.
CPC ...... *H04L 63/0838* (2013.01); *H04L 63/0853* (2013.01); *H04L 2463/082* (2013.01)

(58) Field of Classification Search
CPC ............. H04L 63/0838; H04L 63/0853; H04L 2463/082
See application file for complete search history.

(56) References Cited

U.S. PATENT DOCUMENTS

| | | | | |
|---|---|---|---|---|
| 8,572,684 | B1* | 10/2013 | Sama | H04L 63/0838 726/2 |
| 8,955,076 | B1* | 2/2015 | Faibish | H04L 63/08 726/7 |
| 9,419,968 | B1* | 8/2016 | Pei | G06F 21/31 |
| 9,774,579 | B2* | 9/2017 | Oberheide | H04L 63/068 |
| 9,807,087 | B2* | 10/2017 | Hinton | H04L 63/0846 |
| 2008/0168543 | A1* | 7/2008 | von Krogh | G06F 21/31 726/6 |
| 2009/0172402 | A1* | 7/2009 | Tran | G06Q 20/102 713/170 |
| 2011/0197266 | A1* | 8/2011 | Chu | H04L 9/3228 726/5 |
| 2011/0302645 | A1* | 12/2011 | Headley | H04L 9/3215 726/7 |

(Continued)

*Primary Examiner* — James R Turchen
(74) *Attorney, Agent, or Firm* — Banner & Witcoff, Ltd.; Michael A. Springs

(57) ABSTRACT

A computing platform may receive, from a client portal server, a request to authenticate a user to a user account a client portal. Based on identifying an activity the request, the computing platform may select a multi-device authentication method for authenticating the user. The computing platform may generate a first one-time passcode for a first registered device and a second one-time passcode for a second registered device, and may send the one-time passcodes to the registered devices. Thereafter, the computing platform may receive and validate one-time passcode input from the client portal server. Based on validating the one-time passcode input, the computing platform may generate a validation message directing the client portal server to provide the user with access to the user account, and may send the validation message to the client portal server. In some instances, different authentication methods may be selected for different activities.

20 Claims, 14 Drawing Sheets

400

Client Portal
<First1 Last1>

We have sent one-time passcodes to your registered devices. Please enter these passcodes in the fields below to continue:

OTP1: _____

OTP2: _____

| Help | Next |

(56) References Cited

U.S. PATENT DOCUMENTS

| | | | |
|---|---|---|---|
| 2012/0066749 A1* | 3/2012 | Taugbol | G06F 21/35 726/6 |
| 2013/0139222 A1* | 5/2013 | Kirillin | H04L 67/02 726/4 |
| 2013/0159195 A1* | 6/2013 | Kirillin | G06Q 20/322 705/71 |
| 2013/0254036 A1* | 9/2013 | Trinh | G06Q 30/0251 705/14.64 |
| 2013/0297513 A1* | 11/2013 | Kirillin | G06Q 40/02 705/67 |
| 2014/0208401 A1* | 7/2014 | Balakrishnan | H04L 63/08 726/5 |
| 2014/0250518 A1* | 9/2014 | Schneider | G06F 21/34 726/9 |
| 2014/0310514 A1* | 10/2014 | Favero | H04L 9/0869 713/153 |
| 2014/0344904 A1* | 11/2014 | Venkataramani | G06F 21/35 726/5 |
| 2015/0046990 A1* | 2/2015 | Oberheide | G06F 21/32 726/6 |
| 2015/0161378 A1* | 6/2015 | Oberheide | G06F 21/45 726/1 |
| 2015/0244706 A1* | 8/2015 | Grajek | H04L 63/0815 726/6 |
| 2015/0256973 A1* | 9/2015 | Raounak | H04W 4/029 726/7 |
| 2015/0304110 A1* | 10/2015 | Oberheide | H04L 63/12 713/155 |
| 2016/0139582 A1 | 5/2016 | Matsuoka et al. | |
| 2016/0140545 A1 | 5/2016 | Flurscheim et al. | |
| 2016/0142385 A1 | 5/2016 | Robison et al. | |
| 2016/0142916 A1 | 5/2016 | Yocam et al. | |
| 2016/0148012 A1 | 5/2016 | Khitrov et al. | |
| 2016/0148196 A1 | 5/2016 | Dides et al. | |
| 2016/0148487 A1 | 5/2016 | Thomas | |
| 2016/0149417 A1 | 5/2016 | Davis et al. | |
| 2016/0154952 A1 | 6/2016 | Venkatraman et al. | |
| 2016/0155121 A1 | 6/2016 | Weiss | |
| 2016/0162854 A1 | 6/2016 | Grigg et al. | |
| 2016/0162897 A1 | 6/2016 | Feeney | |
| 2016/0162902 A1 | 6/2016 | Weiss | |
| 2016/0162903 A1 | 6/2016 | Weiss | |
| 2016/0164731 A1 | 6/2016 | Jou et al. | |
| 2016/0164748 A1 | 6/2016 | Kim | |
| 2016/0164855 A1 | 6/2016 | Johansson et al. | |
| 2016/0164858 A1 | 6/2016 | Grigg et al. | |
| 2016/0164870 A1 | 6/2016 | Grigg et al. | |
| 2016/0171486 A1 | 6/2016 | Wagner et al. | |
| 2016/0173281 A1 | 6/2016 | White et al. | |
| 2016/0173504 A1 | 6/2016 | Grigg et al. | |
| 2016/0179454 A1 | 6/2016 | Liu | |
| 2016/0180060 A1 | 6/2016 | Nelson | |
| 2016/0180078 A1 | 6/2016 | Chhabra et al. | |
| 2016/0180454 A1 | 6/2016 | Yeri et al. | |
| 2016/0182221 A1 | 6/2016 | Cucinotta et al. | |
| 2016/0182464 A1 | 6/2016 | Mintz | |
| 2016/0182476 A1 | 6/2016 | Sakumoto et al. | |
| 2016/0182613 A1 | 6/2016 | Brune et al. | |
| 2016/0185527 A1 | 6/2016 | Greyshock | |
| 2016/0188864 A1 | 6/2016 | Hillis | |
| 2016/0191484 A1 | 6/2016 | Gongaware | |
| 2016/0191487 A1 | 6/2016 | Twitchell, Jr. et al. | |
| 2016/0191488 A1 | 6/2016 | Twitchell, Jr. et al. | |
| 2016/0191499 A1 | 6/2016 | Momchilov et al. | |
| 2016/0191520 A1 | 6/2016 | Voice et al. | |
| 2016/0191715 A1 | 6/2016 | Mohammed et al. | |
| 2016/0195602 A1 | 7/2016 | Meadow | |
| 2016/0196414 A1 | 7/2016 | Stuntebeck et al. | |
| 2016/0196705 A1 | 7/2016 | Tehranchi et al. | |
| 2016/0196706 A1 | 7/2016 | Tehranchi et al. | |
| 2016/0197914 A1* | 7/2016 | Oberheide | H04L 63/0838 713/183 |
| 2016/0197937 A1 | 7/2016 | Roth et al. | |
| 2016/0203292 A1 | 7/2016 | Kamen et al. | |
| 2016/0203306 A1 | 7/2016 | Boshra | |
| 2016/0203315 A1 | 7/2016 | Wentz et al. | |
| 2016/0203346 A1 | 7/2016 | Gardiner et al. | |
| 2016/0203467 A1 | 7/2016 | Khan et al. | |
| 2016/0205075 A1 | 7/2016 | Asokan et al. | |
| 2016/0205546 A1 | 7/2016 | Poon et al. | |
| 2016/0248752 A1* | 8/2016 | Blinn | H04L 63/083 |
| 2016/0269403 A1* | 9/2016 | Koutenaei | H04L 63/0861 |
| 2016/0285871 A1* | 9/2016 | Chathoth | H04L 63/0807 |
| 2016/0337344 A1* | 11/2016 | Johansson | H04L 63/0838 |
| 2016/0344730 A1* | 11/2016 | Holz | H04L 63/0876 |
| 2016/0366122 A1* | 12/2016 | Rykowski | H04L 63/0815 |
| 2016/0373430 A1* | 12/2016 | Bhat | H04L 63/0823 |
| 2017/0032111 A1* | 2/2017 | Johansson | G06F 21/31 |
| 2017/0078270 A1* | 3/2017 | Tang | H04L 63/0815 |
| 2017/0126660 A1* | 5/2017 | Brannon | H04L 63/0815 |
| 2017/0279795 A1* | 9/2017 | Redberg | H04L 63/0838 |

* cited by examiner

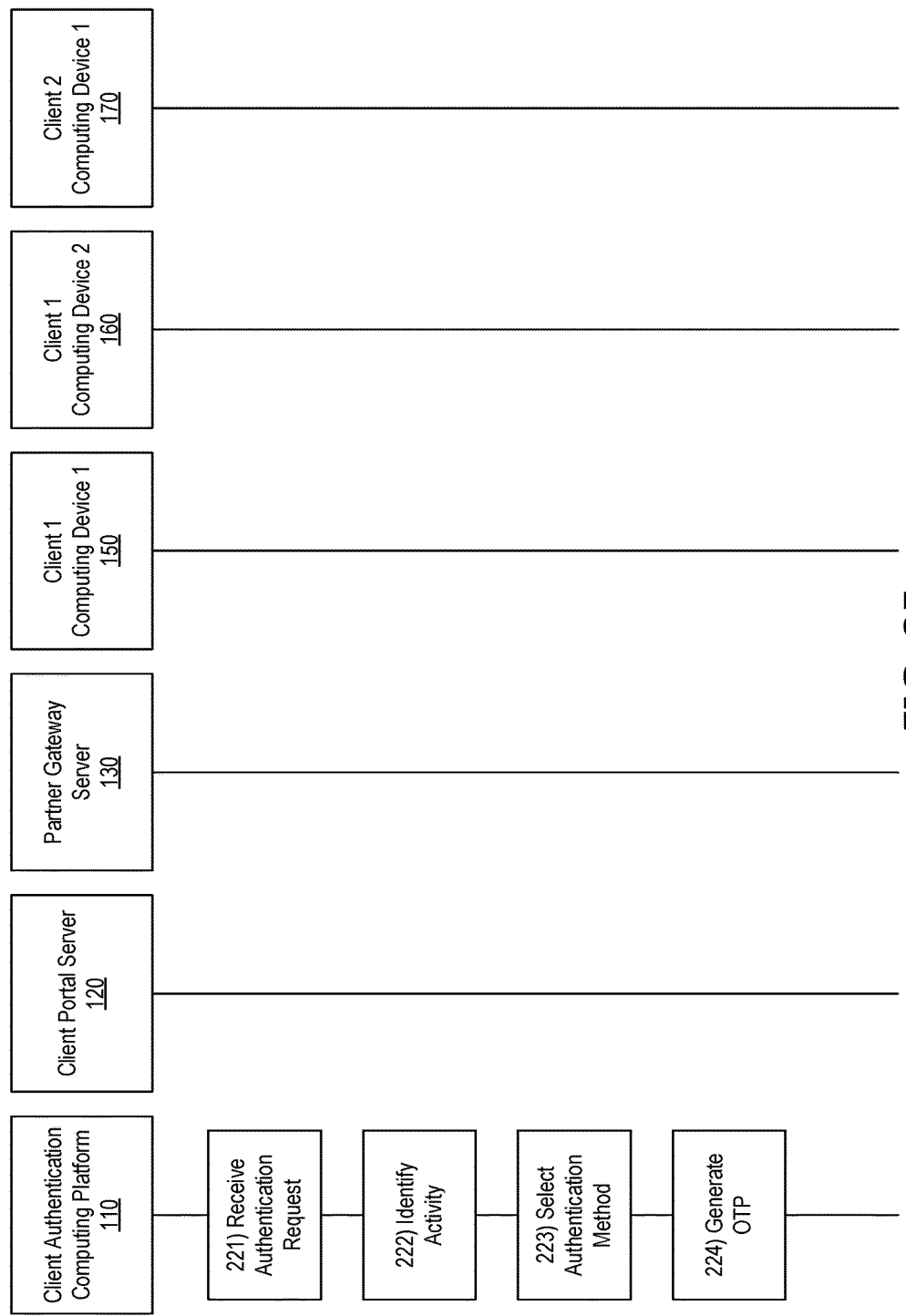

700

Partner Gateway
*<First2 Last2>*

We have sent a one-time passcode to your registered device. Please enter this passcode in the field below to continue:

OTP1: _____

| Help | Next |

Partner Gateway
*Non-Banking Menu*

Thank you <First2 Last2>! You have been authenticated to your user account. Please select a function below.

Complete Shopping Transaction
View Special Offers
Check Order History
More...

| Help | Logout |

FIG. 8

PREVENTING UNAUTHORIZED ACCESS TO SECURED INFORMATION SYSTEMS USING MULTI-DEVICE AUTHENTICATION TECHNIQUES

BACKGROUND

Aspects of the disclosure relate to providing information security and preventing unauthorized access to resources of an information system. In particular, one or more aspects of the disclosure relate to preventing unauthorized access to secured information systems using multi-device authentication techniques.

As organizations increasingly provide electronic portals via which various users may access, view, and/or modify information, including client information, ensuring the safety and security of information maintained by such organizations and/or made available via such portals is increasingly important. In many instances, however, it may be difficult to ensure the safety and security of such information while also optimizing the efficient and effective technical operations of the computer systems that maintain such information and/or provide such portals.

SUMMARY

Aspects of the disclosure provide effective, efficient, scalable, and convenient technical solutions that address and overcome the technical problems associated with providing information security and preventing unauthorized access to resources of an information system by implementing multi-device authentication techniques.

In accordance with one or more embodiments, a computing platform having at least one processor, a memory, and a communication interface may receive, via the communication interface, and from a client portal server, a request to authenticate a first user to a first user account associated with a client portal provided by the client portal server. Subsequently, the computing platform may identify a requested activity associated with the request to authenticate the first user to the first user account as a first activity. Based on identifying the requested activity associated with the request to authenticate the first user to the first user account as the first activity, the computing platform may select a multi-device authentication method for authenticating the first user to the first user account associated with the client portal provided by the client portal server. Based on selecting the multi-device authentication method for authenticating the first user to the first user account associated with the client portal provided by the client portal server, the computing platform may generate a first one-time passcode for a first registered device and a second one-time passcode for a second registered device. Subsequently, the computing platform may send, via the communication interface, the first one-time passcode to the first registered device and the second one-time passcode to the second registered device. Thereafter, the computing platform may receive, via the communication interface, and from the client portal server, first one-time passcode input. The computing platform may validate the first one-time passcode input received from the client portal server. Based on validating the first one-time passcode input received from the client portal server, the computing platform may generate a first validation message directing the client portal server to provide the first user with access to the first user account. Subsequently, the computing platform may send, via the communication interface, to the client portal server, the first validation message directing the client portal server to provide the first user with access to the first user account.

In some embodiments, prior to receiving the request to authenticate the first user to the first user account associated with the client portal provided by the client portal server, the computing platform may receive first device registration information for the first user account associated with the client portal provided by the client portal server. Subsequently, the computing platform may store the first device registration information for the first user account associated with the client portal provided by the client portal server. In addition, the first device registration information may identify the first registered device and the second registered device as authorized passcode recipients for the first user account associated with the client portal provided by the client portal server.

In some embodiments, identifying the requested activity associated with the request to authenticate the first user to the first user account as the first activity may include: generating a first activity selection prompt directing the client portal server to prompt the first user to select an activity; sending, to the client portal server, the first activity selection prompt directing the client portal server to prompt the first user to select an activity; and receiving, from the client portal server, first activity selection input selecting the first activity.

In some embodiments, identifying the requested activity associated with the request to authenticate the first user to the first user account as the first activity may include identifying the first activity based on a source of the request to authenticate the first user to the first user account.

In some embodiments, the computing platform may receive, via the communication interface, and from a partner gateway server, a request to authenticate a second user to a second user account associated with the client portal provided by the client portal server. Subsequently, the computing platform may identify a requested activity associated with the request to authenticate the second user to the second user account as a second activity. Based on identifying the requested activity associated with the request to authenticate the second user to the second user account as the second activity, the computing platform may select a single-device authentication method for authenticating the second user to the second user account associated with the client portal provided by the client portal server. Based on selecting the single-device authentication method for authenticating the second user to the second user account associated with the client portal provided by the client portal server, the computing platform may generate a third one-time passcode for a third registered device. Subsequently, the computing platform may send, via the communication interface, the third one-time passcode to the third registered device. Thereafter, the computing platform may receive, via the communication interface, and from the partner gateway server, second one-time passcode input. The computing platform may validate the second one-time passcode input received from the partner gateway server. Based on validating the second one-time passcode input received from the partner gateway server, the computing platform may generate a second validation message directing the partner gateway server to provide the second user with access to the second user account. Subsequently, the computing platform may send, via the communication interface, to the partner gateway server, the second validation message directing the partner gateway server to provide the second user with access to the second user account.

In some embodiments, prior to receiving the request to authenticate the second user to the second user account associated with the client portal provided by the client portal server, the computing platform may receive second device registration information for the second user account associated with the client portal provided by the client portal server. Subsequently, the computing platform may store the second device registration information for the second user account associated with the client portal provided by the client portal server. In addition, the second device registration information may identify the third registered device as an authorized passcode recipient for the second user account associated with the client portal provided by the client portal server.

In some embodiments, identifying the requested activity associated with the request to authenticate the second user to the second user account as the second activity may include: generating a second activity selection prompt directing the partner gateway server to prompt the second user to select an activity; sending, to the partner gateway server, the second activity selection prompt directing the partner gateway server to prompt the second user to select an activity; and receiving, from the partner gateway server, second activity selection input selecting the second activity.

In some embodiments, identifying the requested activity associated with the request to authenticate the second user to the second user account as the second activity may include identifying the second activity based on a source of the request to authenticate the second user to the second user account.

In some embodiments, the first activity may be associated with a greater level of access to user account information than the second activity.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for preventing unauthorized access to secured information systems using multi-device authentication techniques in accordance with one or more example embodiments;

FIGS. 3-8 depict example graphical user interfaces for preventing unauthorized access to secured information systems using multi-device authentication techniques in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosure relate to implementing activity-based authentication techniques. For example, when authenticating a customer to online banking or mobile banking, an authentication server may use different authentication strategies and prompt for different authenticators depending on the customer's current or requested activity. For instance, if banking activity is requested, the authentication server may require more complex authentication, such as one-time passcode authentication or multi-device one-time passcode authentication, whereas if shopping activity is requested, the authentication server might require simpler authentication, such as username and password authentication or single-device one-time passcode authentication.

Figure 1A:
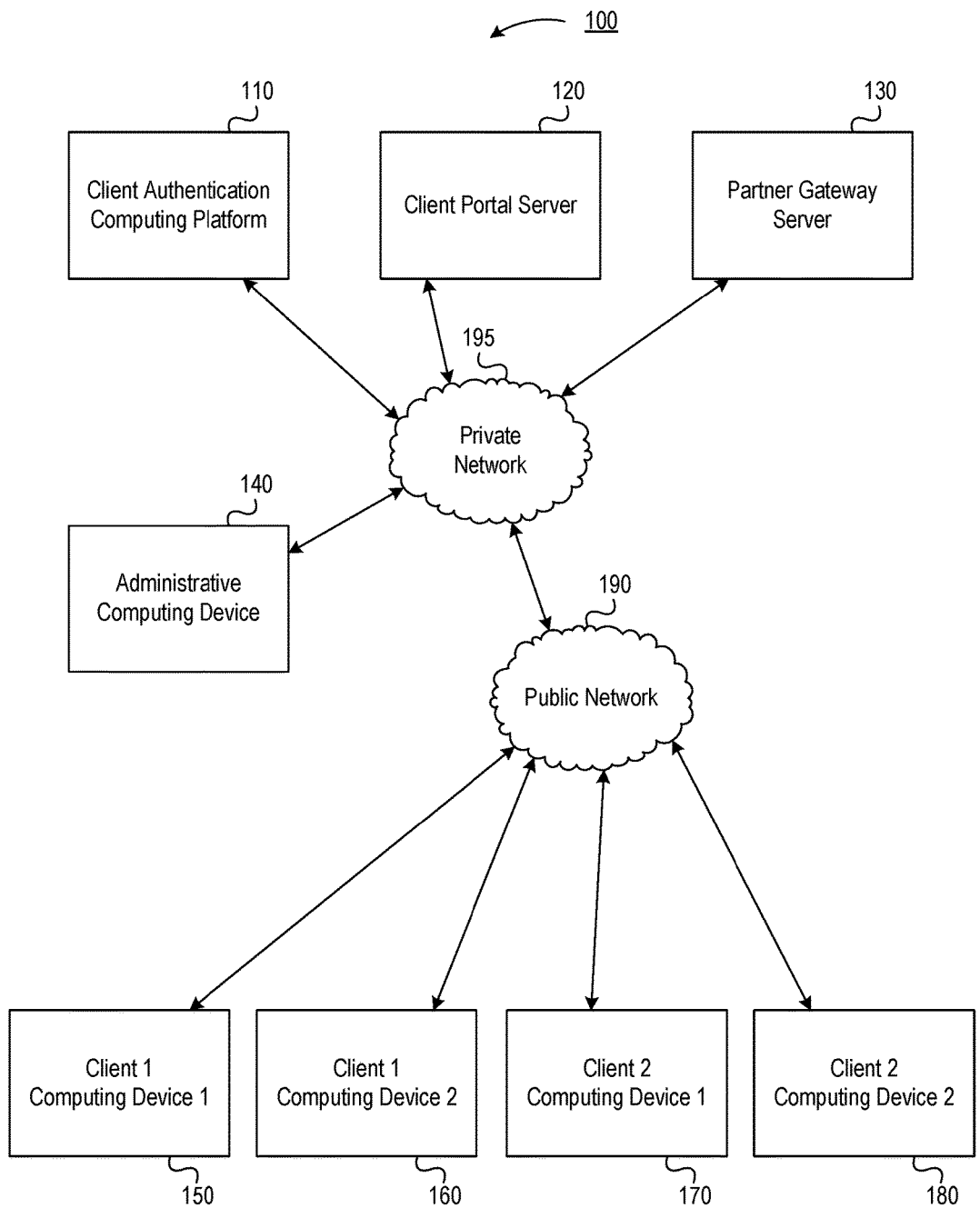
FIGS. 1A and 1B depict an illustrative computing environment for preventing unauthorized access to secured information systems using multi-device authentication techniques in accordance with one or more example embodiments.
Figure 1B:
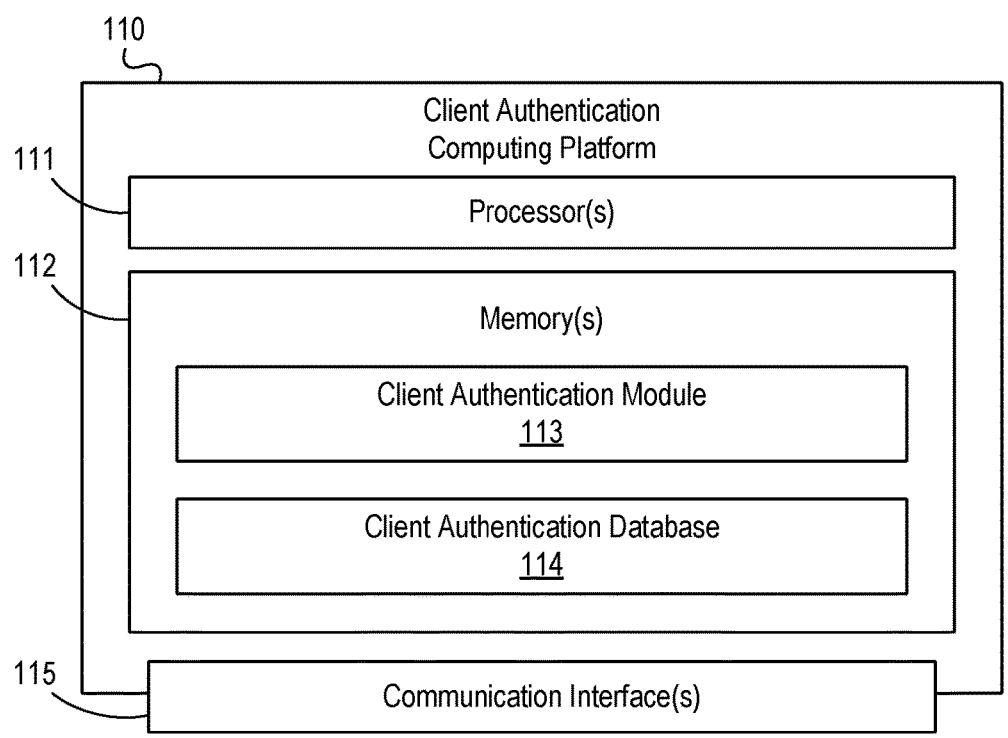

FIGS. 1A and 1B depict an illustrative computing environment for preventing unauthorized access to secured information systems using multi-device authentication techniques in accordance with one or more example embodiments. Referring to FIG. 1A, computing environment 100 may include one or more computing devices. For example, computing environment 100 may include a client portal server 120, a partner gateway server 130, an administrative computing device 140, a first client computing device 150, a second client computing device 160, a third client computing device 170, and a fourth client computing device 180.

Client portal server 120 may be configured to provide one or more portal interfaces to one or more client devices. For example, client portal server 120 may be configured to provide a customer portal, such as an online banking portal, to one or more customers of an organization, such as a financial institution, who may use one or more client computing devices to access the portal, such as client computing device 150, client computing device 160, client computing device 170, and client computing device 180, as illustrated in greater detail below. In some instances, in addition to being configured to provide an online banking portal associated with a financial institution to one or more customers of the financial institution and/or their associated computing devices, client portal server 120 also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Partner gateway server 130 may be configured to provide one or more gateway interfaces to one or more client devices. For example, partner gateway server 130 may be configured to provide a partner gateway web site, one or more partner gateway webpages, and/or one or more other partner gateway web elements to one or more customers of an organization, such as a financial institution, who may use one or more client computing devices to access such web elements, such as client computing device 150, client computing device 160, client computing device 170, and client computing device 180, as illustrated in greater detail below.

In some instances, partner gateway server 130 may integrate with and/or interface with one or more vendor servers and/or websites and/or other third-party servers and/or websites (which, e.g., might not be associated with a financial institution or other organization operating client portal server 120) so as to allow a user of a user account associated with a client portal provided by client portal server 120 to use their user account in connection with one or more services provided by partner gateway server 130 and/or one or more vendor servers and/or websites and/or other third-party servers and/or websites with which partner gateway server 130 may integrate with and/or interface with. For example, partner gateway server 130 may provide one or more payment interfaces, checkout interfaces, and/or other shopping interfaces that may enable a user of a user account associated with a client portal provided by client portal server 120, such as an online banking portal or a mobile banking portal, to use their client portal user account (e.g., their online banking account, mobile banking account, and/or the like) to complete payment transactions when performing shopping activities involving merchant websites and/or other third-party web sites.

Administrative computing device 140 may be configured to provide one or more interfaces that allow for configuration and management of one or more other computing devices and/or computer systems included in computing environment 100. Client computing device 150 may be configured to be used by a first customer of an organization, such as a financial institution. Client computing device 160 also may be configured to be used by the first customer of the organization. In some instances, client computing device 150 and client computing device 160 may, for example, be registered with the organization and/or one or more computer systems in computing environment 100, such that the organization and/or the one or more computer systems maintain one or more records linking client computing device 150 and client computing device 160 to the first customer of the organization, as discussed in greater detail below. Client computing device 170 may be configured to be used by a second customer of the organization (who may, e.g., be different from the first customer of the organization). Client computing device 180 also may be configured to be used by the second customer of the organization. In some instances, client computing device 170 and client computing device 180 may, for example, be registered with the organization and/or one or more computer systems in computing environment 100, such that the organization and/or the one or more computer systems maintain one or more records linking client computing device 170 and client computing device 180 to the second customer of the organization, as discussed in greater detail below.

In one or more arrangements, client portal server 120, partner gateway server 130, administrative computing device 140, client computing device 150, client computing device 160, client computing device 170, and client computing device 180 may be any type of computing device capable of receiving a user interface, receiving input via the user interface, and communicating the received input to one or more other computing devices. For example, client portal server 120, partner gateway server 130, administrative computing device 140, client computing device 150, client computing device 160, client computing device 170, and client computing device 180 may, in some instances, be and/or include server computers, desktop computers, laptop computers, tablet computers, smart phones, or the like that may include one or more processors, memories, communication interfaces, storage devices, and/or other components.

As noted above, and as illustrated in greater detail below, any and/or all of client portal server 120, partner gateway server 130, administrative computing device 140, client computing device 150, client computing device 160, client computing device 170, and client computing device 180 may, in some instances, be special-purpose computing devices configured to perform specific functions.

Computing environment 100 also may include one or more computing platforms. For example, computing environment 100 may include client authentication computing platform 110. As illustrated in greater detail below, client authentication computing platform 110 may include one or more computing devices configured to perform one or more of the functions described herein. For example, client authentication computing platform 110 may include one or more computers (e.g., laptop computers, desktop computers, servers, server blades, or the like).

Computing environment 100 also may include one or more networks, which may interconnect one or more of client authentication computing platform 110, client portal server 120, partner gateway server 130, administrative computing device 140, client computing device 150, client computing device 160, client computing device 170, and client computing device 180. For example, computing environment 100 may include public network 190 and private network 195. Private network 195 and/or public network 190 may include one or more sub-networks (e.g., local area networks (LANs), wide area networks (WANs), or the like). Private network 195 may be associated with a particular organization (e.g., a corporation, financial institution, educational institution, governmental institution, or the like) and may interconnect one or more computing devices associated with the organization. For example, client authentication computing platform 110, client portal server 120, partner gateway server 130, and administrative computing device 140 may be associated with an organization (e.g., a financial institution), and private network 195 may be associated with and/or operated by the organization, and may include one or more networks (e.g., LANs, WANs, virtual private networks (VPNs), or the like) that interconnect client authentication computing platform 110, client portal server 120, partner gateway server 130, and administrative computing device 140 and one or more other computing devices and/or computer systems that are used by, operated by, and/or otherwise associated with the organization. Public network 190 may connect private network 195 and/or one or more computing devices connected thereto (e.g., client authentication computing platform 110, client portal server 120, partner gateway server 130, and administrative computing device 140) with one or more networks and/or computing devices that are not associated with the organization. For example, client computing device 150, client computing device 160, client computing device 170, and client computing device 180 might not be associated with an organization that operates private network 195 (e.g., because client computing device 150, client computing device 160, client computing device 170, and client computing device 180 may be owned, operated, and/or serviced by one or more entities different from the organization that operates private network 195, such as one or more customers of the organization and/or vendors of the organization, rather than being owned and/or operated by the organization itself or an employee or affiliate of the organization), and public network 190 may include one or more networks (e.g., the internet) that connect client computing device 150, client computing device 160, client computing device 170, and client computing device 180 to private network 195 and/or one or more computing devices connected thereto (e.g., client authentication computing platform 110, client portal server 120, partner gateway server 130, and administrative computing device 140).

Referring to FIG. 1B, client authentication computing platform 110 may include one or more processors 111, memory 112, and communication interface 115. A data bus may interconnect processor(s) 111, memory 112, and communication interface 115. Communication interface 115 may be a network interface configured to support communication between client authentication computing platform 110 and one or more networks (e.g., private network 195, public network 190, or the like). Memory 112 may include one or more program modules having instructions that when executed by processor(s) 111 cause client authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of client authentication computing platform 110 and/or by different computing devices that may form and/or otherwise make up client authentication computing platform 110. For example, memory 112 may have, store, and/or include a client authentication module 113 and a client authentication database 114. Client authentication module 113 may have instructions that direct and/or cause client authentication computing platform 110 to authenticate one or more users and/or devices using multi-device authentication techniques and/or to perform other functions, as discussed in greater detail below. Client authentication database 114 may store information used by client authentication module 113 and/or client authentication computing platform 110 in authenticating one or more users and/or devices using multi-device authentication techniques and/or in performing other functions.

Figure 2A:
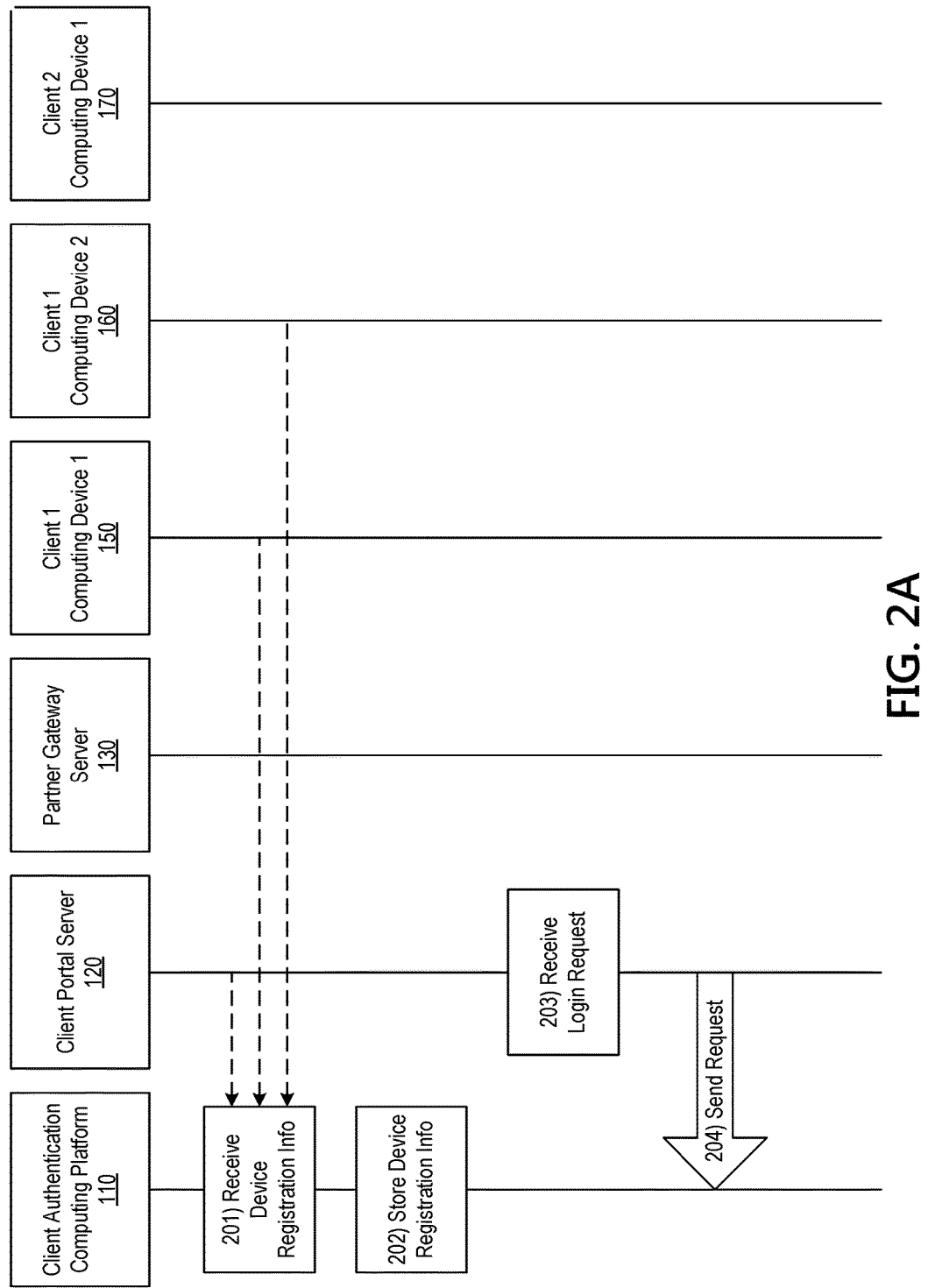

FIGS. 2A-2H depict an illustrative event sequence for preventing unauthorized access to secured information systems using multi-device authentication techniques in accordance with one or more example embodiments. Referring to FIG. 2A, at step 201, client authentication computing platform 110 may receive device registration information for a first user account (e.g., from client portal server 120, client computing device 150, client computing device 160, and/or one or more other devices). For example, at step 201, client authentication computing platform 110 may receive first device registration information for a first user account associated with a client portal provided by a client portal server (e.g., client portal server 120). Such device registration information may, for example, register and/or otherwise link client computing device 150, client computing device 160, and/or one or more other devices to the first user account (e.g., as authorized one-time passcode recipient devices for the first user account). In some instances, such device registration information may, for example, include a unique identifier associated with a particular client device being registered (such as client computing device 150 and/or client computing device 160, for instance), a name and/or label associated with the particular client device being registered, one or more client portal usernames associated with the particular client device being registered, one or more account numbers and/or other account identifiers associated with the particular client device being registered, one or more authorized regions and/or countries associated with the particular client device being registered, and/or other information.

At step 202, client authentication computing platform 110 may store the device registration information for the first user account. For example, at step 202, client authentication computing platform 110 may store the first device registration information for the first user account associated with the client portal provided by the client portal server (e.g., client portal server 120). In addition, the first device registration information may identify a first registered device (e.g., client computing device 150) and a second registered device (e.g., client computing device 160) as authorized passcode recipients for the first user account associated with the client portal provided by the client portal server (e.g., client portal server 120).

At step 203, client portal server 120 may receive a login request. For example, at step 203, client portal server 120 may receive a login request from client computing device 150, client computing device 160, and/or another computing device requesting access to the client portal provided by the client portal server (e.g., client portal server 120) and/or to the first user account associated with the client portal provided by the client portal server (e.g., client portal server 120). At step 204, client portal server 120 may send an authentication request to client authentication computing platform 110. For example, at step 204, client portal server 120 may send an authentication request to client authentication computing platform 110 requesting client authentication computing platform 110 to authenticate a user of the client portal associated with the login request to a particular user account to which the user of the client portal has requested access (which may, e.g., be the first user account associated with the client portal provided by client portal server 120).

Figure 2B:
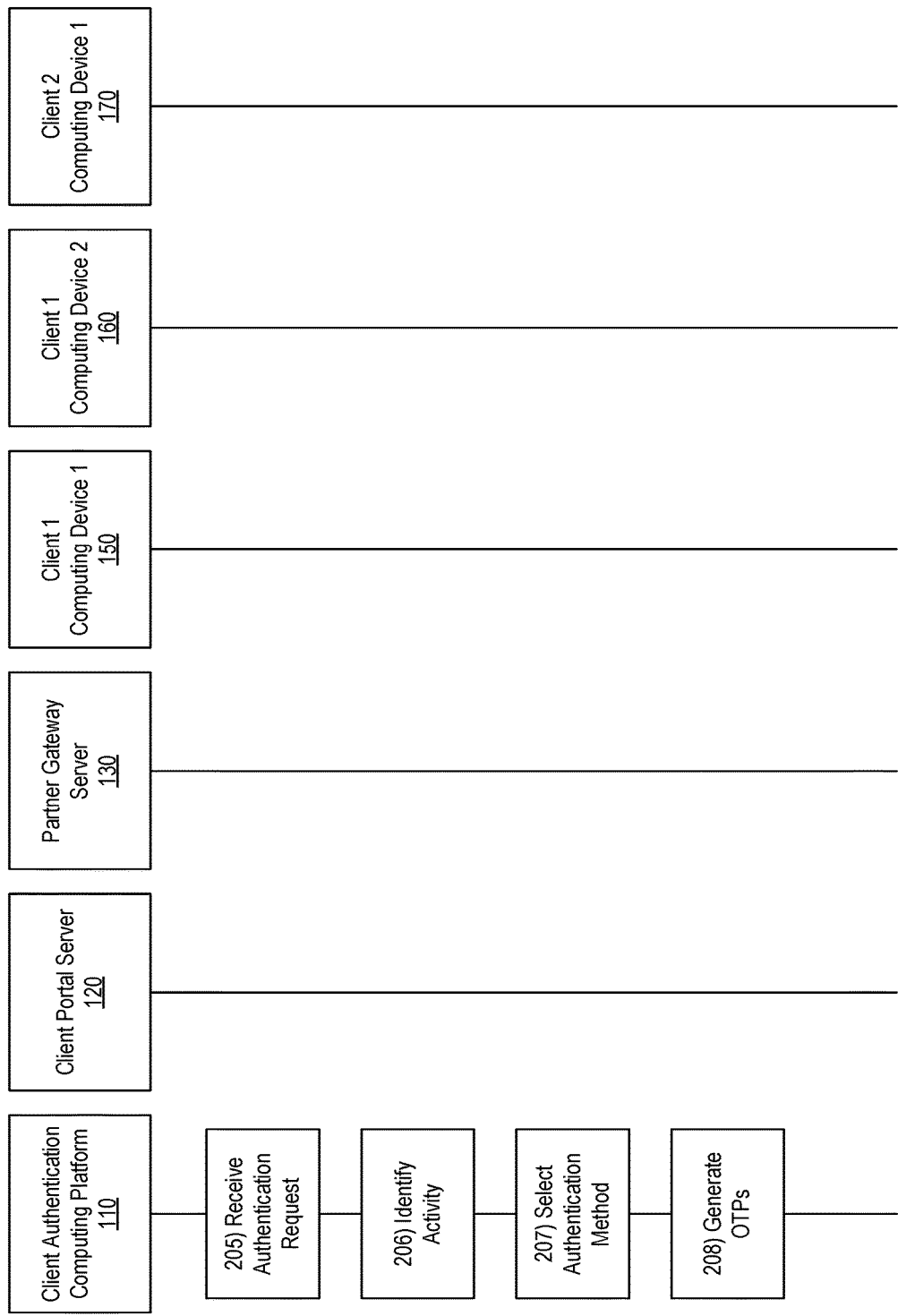

Referring to FIG. 2B, at step 205, client authentication computing platform 110 may receive the authentication request from client portal server 120. For example, at step 205, client authentication computing platform 110 may receive, via the communication interface (e.g., communication interface 115), and from a client portal server (e.g., client portal server 120), a request to authenticate a first user to a first user account associated with a client portal provided by the client portal server (e.g., client portal server 120).

At step 206, client authentication computing platform 110 may identify an activity associated with the authentication request received from client portal server 120. For example, at step 206, client authentication computing platform 110 may identify a requested activity associated with the request to authenticate the first user to the first user account as a first activity. For instance, client authentication computing platform 110 may store and/or maintain information defining a plurality of predefined activities that may be performed using one or more user accounts, including the first user account. Such activities may, for instance, include banking activities, shopping activities, lifestyle activities, and/or other activities. In addition, the authentication request received from client portal server 120 may include information identifying a requested activity, and client authentication computing platform 110 may accordingly identify a particular activity as being associated with the authentication request received from client portal server 120. For instance, in the example illustrated in the example event sequence and discussed in greater detail below, client authentication computing platform 110 may identify a banking activity as being the activity associated with the authentication request received from client portal server 120. In some instances, client authentication computing platform 110 may select and use different authentication methods in authenticating a user to a user account depending on the activity for which the user account is to be used (which may, e.g., correspond to the activity identified at step 206), because different activities may require different levels of access to the user account and thus may require relatively higher or lower levels of user account security.

In some embodiments, identifying the requested activity associated with the request to authenticate the first user to the first user account as the first activity may include: generating a first activity selection prompt directing the client portal server to prompt the first user to select an activity; sending, to the client portal server, the first activity selection prompt directing the client portal server to prompt the first user to select an activity; and receiving, from the client portal server, first activity selection input selecting the first activity. For example, in identifying the requested activity associated with the request to authenticate the first user to the first user account as the first activity (e.g., at step 206), client authentication computing platform 110 may generate a first activity selection prompt directing the client portal server (e.g., client portal server 120) to prompt the first user to select an activity. Subsequently, client authentication computing platform 110 may send, to the client portal server (e.g., client portal server 120), the first activity selection prompt directing the client portal server (e.g., client portal server 120) to prompt the first user to select an activity. For example, the first activity selection prompt may cause client portal server 120 to present one or more graphical user interfaces prompting the first user to select an activity for which the user account is to be used (e.g., a banking activity, a shopping activity, a lifestyle activity, or the like), as client authentication computing platform 110 may select a different authentication method for authenticating the user to the user account depending on the activity that is selected. Thereafter, client authentication computing platform 110 may receive, from the client portal server (e.g., client portal server 120), first activity selection input selecting the first activity.

In some embodiments, identifying the requested activity associated with the request to authenticate the first user to the first user account as the first activity may include identifying the first activity based on a source of the request to authenticate the first user to the first user account. For example, in identifying the requested activity associated with the request to authenticate the first user to the first user account as the first activity, client authentication computing platform 110 may identify the first activity based on a source of the request to authenticate the first user to the first user account. For instance, client authentication computing platform 110 may determine and/or otherwise identify that the activity associated with the request is a particular activity (e.g., the first activity) based on the request originating from client portal server 120 (e.g., as opposed to partner gateway server 130) or another particular source, such as a particular client computing device.

At step 207, client authentication computing platform 110 may select an authentication method (e.g., based on the activity identified as being associated with the authentication request received from client portal server 120). For example, at step 207, based on identifying the requested activity associated with the request to authenticate the first user to the first user account as the first activity, client authentication computing platform 110 may select a multi-device authentication method for authenticating the first user to the first user account associated with the client portal provided by the client portal server (e.g., client portal server 120). For instance, in the example illustrated in the example event sequence, client authentication computing platform 110 may have identified a banking activity as being the activity associated with the authentication request received from client portal server 120 and accordingly may select a multi-device authentication method, such as a multi-device one-time passcode authentication method, for authenticating the first user to the first user account associated with the client portal provided by the client portal server (e.g., client portal server 120). For example, performing a banking activity may require relatively more access to the user account than one or more other predefined activities, and so client authentication computing platform 110 may select a relatively more secure authentication method, such as a multi-device authentication method, instead of one or more other relatively less secure authentication methods, for authenticating the first user to the first user account associated with the client portal provided by the client portal server (e.g., client portal server 120).

Figure 3:
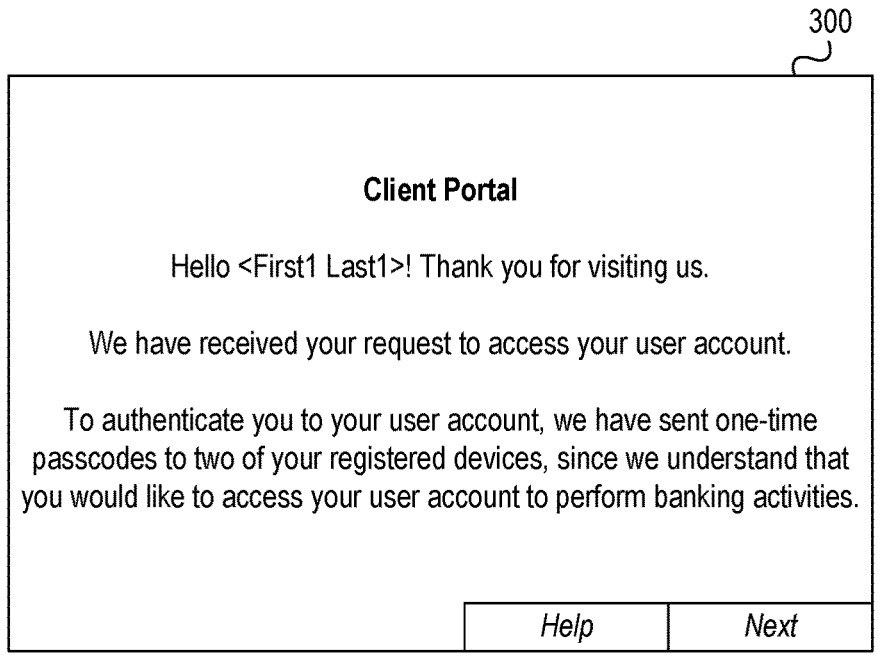

In some instances, after selecting an authentication method (e.g., at step 207), client authentication computing platform 110 may cause client portal server 120 to present and/or cause one or more computing devices (e.g., the device being used by the user of the client portal provided by client portal server 120 to request access to the first user account) to display a graphical user interface similar to graphical user interface 300, which is illustrated in FIG. 3. As seen in FIG. 3, graphical user interface 300 may include information welcoming the user (e.g., "Hello <First1 Last1>! Thank you for visiting us."), indicating that the request to access the user account has been received (e.g., "We have received your request to access your user account"), and informing the user about the authentication method that has been selected (e.g., "To authenticate you to your user account, we have sent one-time passcodes to two of your registered devices, since we understand that you would like to access your user account to perform banking activities.").

At step 208, client authentication computing platform 110 may generate one or more one-time passcodes for one or more registered devices (e.g., based on the authentication method selected at step 207). For example, at step 208, based on selecting the multi-device authentication method for authenticating the first user to the first user account associated with the client portal provided by the client portal server (e.g., client portal server 120), client authentication computing platform 110 may generate a first one-time passcode for a first registered device and a second one-time passcode for a second registered device. For instance, in the example illustrated in the example event sequence, based on selecting a multi-device one-time passcode authentication method at step 207, client authentication computing platform 110 may generate a first one-time passcode for client computing device 150 and a second one-time passcode for client computing device 160. Such one-time passcodes may, for example, be generated by client authentication computing platform 110 using one or more random number generator algorithms. In some instances, client authentication computing platform 110 may, for example, generate and/or send one or more biometric prompts and/or other authentication prompts to the one or more registered devices (e.g., client computing device 150, client computing device 160) instead of and/or in addition to the one-time passcodes.

Figure 2C:
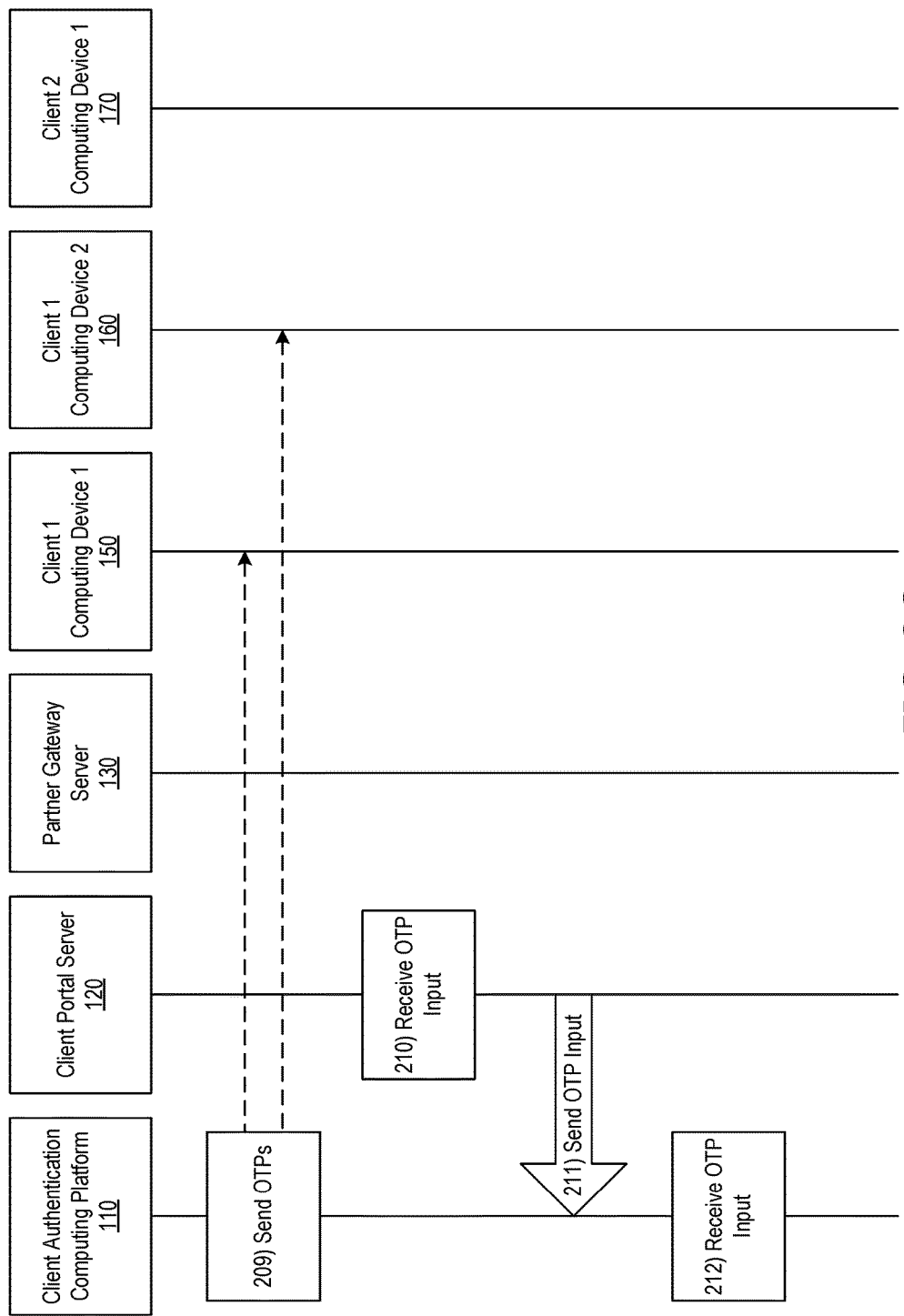

Referring to FIG. 2C, at step 209, client authentication computing platform 110 may send the one or more one-time passcodes to the one or more registered devices. For example, at step 209, client authentication computing platform 110 may send, via the communication interface (e.g., communication interface 115), the first one-time passcode to the first registered device and the second one-time passcode to the second registered device. For instance, client authentication computing platform 110 may send the first one-time passcode to client computing device 150 and the second one-time passcode to client computing device 160. In some instances, client authentication computing platform 110 may send one or more one-time passcodes to one or more mobile devices (e.g., client computing device 150, client computing device 160) via a push notification server and/or a push notification service (which may, e.g., be associated with an operating system executed by the one or more mobile devices). Additionally or alternatively, the one or more one-time passcodes sent to one or more mobile devices (e.g., client computing device 150, client computing device 160) may, in some instances, be presented by a mobile banking application executed by the one or more mobile devices (e.g., client computing device 150, client computing device 160).

Figure 4:
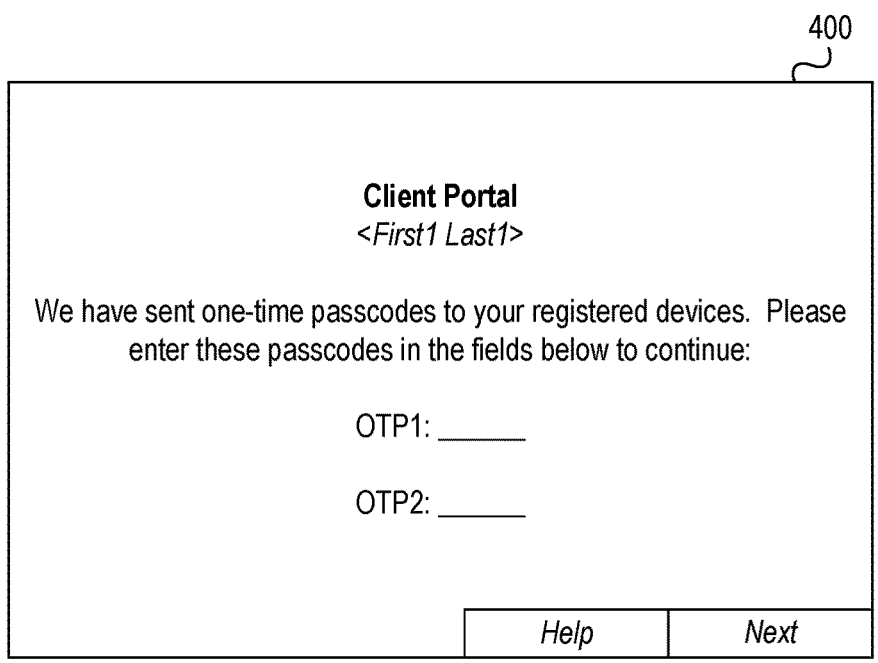

At step 210, client portal server 120 may receive one-time passcode input. For example, at step 210, client portal server 120 may receive one-time passcode input via one or more user interfaces presented by client portal server 120, and such one-time passcode input may include the first one-time passcode generated by client authentication computing platform 110 for the first registered device and the second one-time passcode generated by client authentication computing platform 110 for the second registered device. For instance, in receiving the one-time passcode input at step 210, client portal server 120 may present and/or cause one or more computing devices (e.g., the device being used by the user of the client portal provided by client portal server 120 to request access to the first user account) to display a graphical user interface similar to graphical user interface 400, which is illustrated in FIG. 4. As seen in FIG. 4, graphical user interface 400 may include information prompting a user to input the one-time passcodes sent to the registered devices to continue with the authentication process (e.g., "We have sent one-time passcodes to your registered devices. Please enter these passcodes in the fields below to continue"), as well as one or more fields and/or other controls configured to receive such input from the user (e.g., "OTP1: $_{13}$ _____; OTP2: _____").

At step 211, client portal server 120 may send the one-time passcode input to client authentication computing platform 110. At step 212, client authentication computing platform 110 may receive the one-time passcode input from client portal server 120. For example, at step 212, client authentication computing platform 110 may receive, via the communication interface (e.g., communication interface 115), and from the client portal server (e.g., client portal server 120), first one-time passcode input.

Figure 2D:
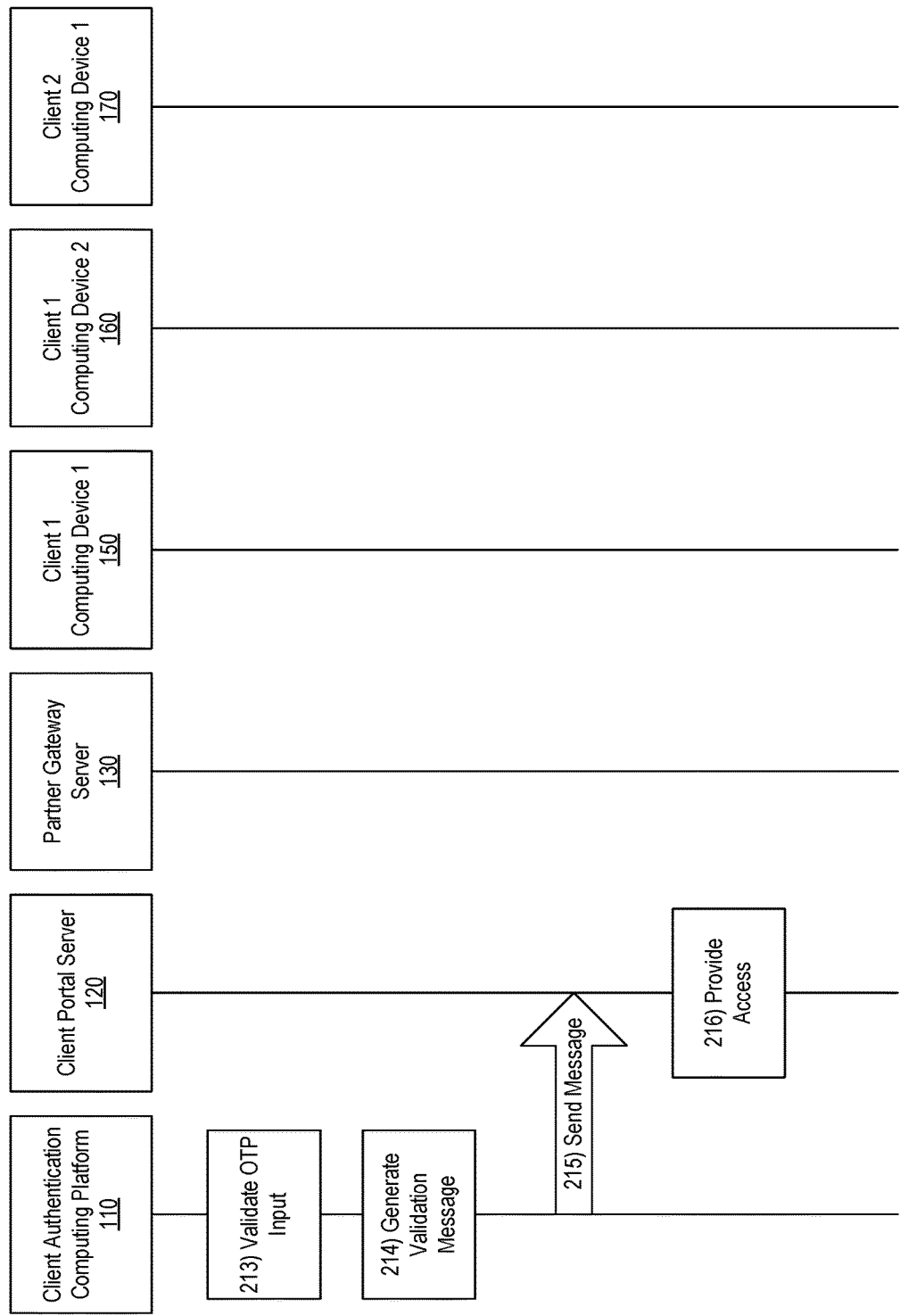

Referring to FIG. 2D, at step 213, client authentication computing platform 110 may validate the one-time passcode input received from client portal server 120. For example, at step 213, client authentication computing platform 110 may validate the first one-time passcode input received from the client portal server (e.g., client portal server 120). In validating the first one-time passcode input, client authentication computing platform 110 may, for example, compare the first one-time passcode input to the first one-time passcode generated by client authentication computing platform 110 for the first registered device and the second one-time passcode generated by client authentication computing platform 110 for the second registered device to confirm that the first one-time passcode input matches the first one-time passcode generated by client authentication computing platform 110 for the first registered device and the second one-time passcode generated by client authentication computing platform 110 for the second registered device and is therefore valid. If client authentication computing platform 110 determines that the first one-time passcode input does not match the first one-time passcode generated by client authentication computing platform 110 for the first registered device and the second one-time passcode generated by client authentication computing platform 110 for the second registered device and is therefore not valid, client authentication computing platform 110 may generate and/or send one or more error messages to client portal server 120 and/or one or more other devices. Such error messages may, for instance, cause client portal server 120 to prompt the user of client portal server 120 requesting access to the first user account to try entering the one-time passcodes again, and if the user again provides invalid one-time passcode input, client authentication computing platform 110 may deny access to the first user account and/or the event sequence may end. If the first one-time passcode input is valid, the event sequence may continue as illustrated.

At step 214, client authentication computing platform 110 may generate a validation message. For example, at step 214, based on validating the first one-time passcode input received from the client portal server (e.g., client portal server 120), client authentication computing platform 110 may generate a first validation message directing the client portal server (e.g., client portal server 120) to provide the first user with access to the first user account. In some instances, in generating the first validation message directing the client portal server (e.g., client portal server 120) to provide the first user with access to the first user account, client authentication computing platform 110 may embed and/or otherwise include one or more tokens, certificates, and/or keys in the first validation message, and such tokens, certificates, and/or keys may be configured to enable and/or cause client portal server 120 to load and/or obtain user account information associated with the first user account from one or more other servers (which may, e.g., be associated with an organization, such as a financial institution, operating client authentication computing platform 110 and/or client portal server 120). For example, client authentication computing platform 110 may embed and/or otherwise include one or more tokens, certificates, and/or keys in the first validation message that enable and/or cause client portal server 120 to request, obtain, receive, and/or load financial account information associated with the first user account from one or more financial account management servers, so that client portal server 120 may subsequently present such financial account information via the client portal.

At step 215, client authentication computing platform 110 may send the validation message to client portal server 120. For example, at step 215, client authentication computing platform 110 may send, via the communication interface (e.g., communication interface 115), to the client portal server (e.g., client portal server 120), the first validation message directing the client portal server (e.g., client portal server 120) to provide the first user with access to the first user account.

At step 216, client portal server 120 may provide the first user with access to the first user account (e.g., based on and/or in response to receiving the validation message from client authentication computing platform 110). In providing the first user with access to the first user account, client portal server 120 may present and/or cause one or more computing devices (e.g., the device being used by the user of the client portal provided by client portal server 120 to request access to the first user account and which has been authenticated to the first user account) to display one or more graphical user interfaces that include account information and/or other information associated with the first user account. Such graphical user interfaces may, for example, be associated with an online banking portal and/or a mobile banking portal, as discussed above, and may include financial account information associated with the first user account, such as account balance information and/or transaction history information, as well as one or more controls via which one or more functions may be performed with respect to such financial account information, such as one or more bill pay functions, funds transfer functions, and/or the like.

Figure 5:
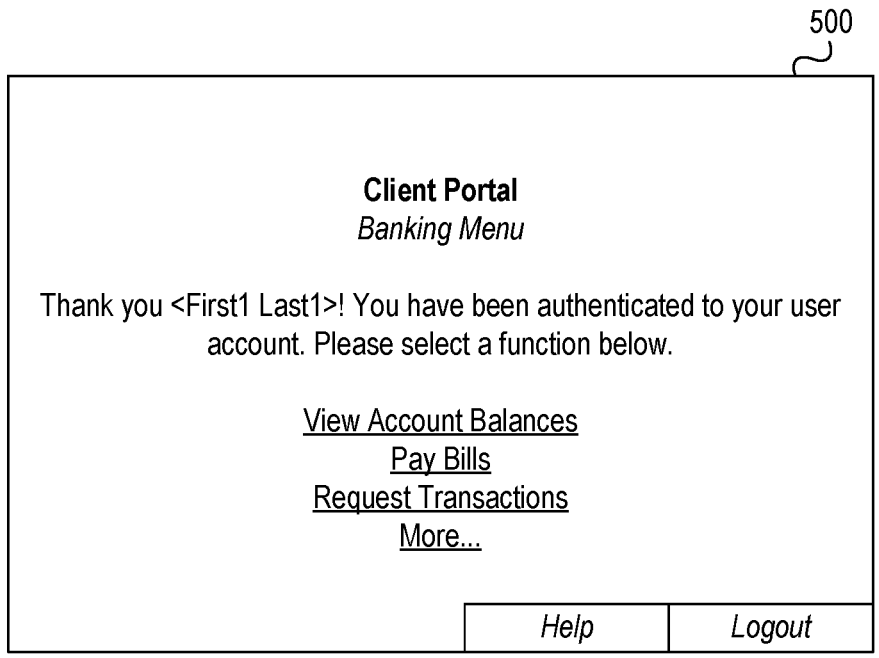

For example, in providing the first user with access to the first user account, client portal server 120 may, in some instances, present and/or cause one or more computing devices (e.g., the device being used by the user of the client portal provided by client portal server 120 to request access to the first user account) to display a graphical user interface similar to graphical user interface 500, which is illustrated in FIG. 5. As seen in FIG. 5, graphical user interface 500 may include information informing the user that they have been authenticated to the user account (e.g., "Thank you <First1 Last1>! You have been authenticated to your user account. Please select a function below.") and may include information providing the user with one or more options for performing the identified activity using the user account, such as one or more options for performing the banking activity using the user account (e.g., "View Account Balances; Pay Bills; Request Transactions; More . . . ").

In one or more alternative arrangements, instead of or in addition to sending one-time passcodes to the first registered device and the second registered device, client authentication computing platform 110 may send one or more biometric authentication prompts and/or other authentication prompts to the first registered device and/or the second registered device. For example, in performing the example sequence of events discussed above in authenticating the first user to the first user account, client authentication computing platform 110 may additionally or alternatively generate and/or send one or more biometric authentication prompts and/or other authentication prompts to one or more registered devices associated with the first user account (e.g., client computing device 150, client computing device 160). Such biometric authentication prompts may, for instance, prompt a recipient device and/or a user of such a recipient device to provide biometric input (e.g., fingerprint biometric input, voiceprint biometric input, facial scan biometric input, retinal scan biometric input, and/or other biometric input) for validation by the recipient device and/or by client authentication computing platform 110.

Subsequently, one or more steps of the event sequence discussed above may be repeated by client authentication computing platform 110 and/or the other systems discussed above in authenticating another user to another user account associated with the client portal provided by client portal server 120. Although such steps are illustrated separately and following the steps performed with respect to authenticating the first user, various steps may be performed in a different order, such that client authentication computing platform 110 may, for instance, authenticate multiple users simultaneously as client portal server 120 and/or partner gateway server 130 receive requests to access different user accounts from different users in connection with different activities. For instance, in the example illustrated in the example event sequence and discussed in greater detail below, client authentication computing platform 110 may authenticate a second user to a second user account to perform a shopping activity or other non-banking activity, which may require relatively less access to a user account than performing a banking activity as in the example discussed above. Accordingly, in the example illustrated in the example event sequence and discussed in greater detail below, client authentication computing platform 110 may select a relatively less secure authentication method (which may, e.g., be faster and/or easier than the relatively more secure authentication method selected in the example discussed above), such as a single device authentication method instead of the multi-device authentication method as in the example discussed above.

Figure 2E:
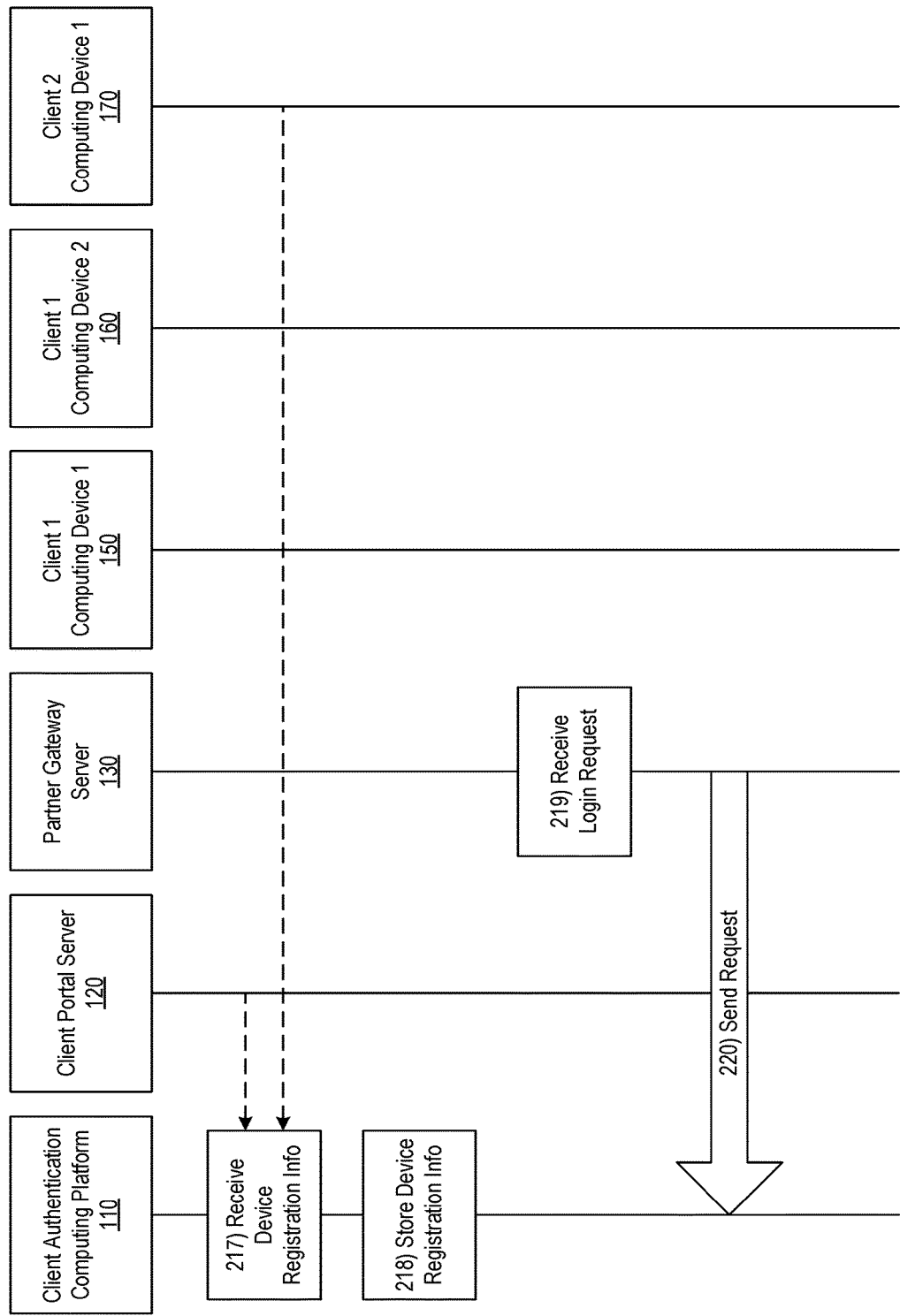

Referring to FIG. 2E, at step 217, client authentication computing platform 110 may receive device registration information for a second user account (e.g., from client portal server 120, client computing device 170, client computing device 180, and/or one or more other devices). For example, at step 217, client authentication computing platform 110 may receive second device registration information for a second user account associated with the client portal provided by the client portal server (e.g., client portal server 120). Such device registration information may, for example, register and/or otherwise link client computing device 170, client computing device 180, and/or one or more other devices to the second user account (e.g., as authorized one-time passcode recipient devices for the second user account). In some instances, such device registration information may, for example, include a unique identifier associated with a particular client device being registered (such as client computing device 170 and/or client computing device 180, for instance), a name and/or label associated with the particular client device being registered, one or more client portal usernames associated with the particular client device being registered, one or more account numbers and/or other account identifiers associated with the particular client device being registered, one or more authorized regions and/or countries associated with the particular client device being registered, and/or other information.

At step 218, client authentication computing platform 110 may store the device registration information for the second user account. For example, at step 218, client authentication computing platform 110 may store the second device registration information for the second user account associated with the client portal provided by the client portal server (e.g., client portal server 120). In addition, the second device registration information may identify a third registered device (e.g., client computing device 170) as an authorized passcode recipient for the second user account associated with the client portal provided by the client portal server (e.g., client portal server 120).

At step 219, partner gateway server 130 may receive a login request. For example, at step 219, partner gateway server 130 may receive a login request from client computing device 170, client computing device 180, and/or another computing device requesting access to a user account associated with the client portal provided by the client portal server (e.g., client portal server 120), such as the second user account associated with the client portal provided by the client portal server (e.g., client portal server 120). For instance, in the example illustrated in the example event sequence and discussed in greater detail below, partner gateway server 130 may receive a login request from client computing device 170, client computing device 180, and/or another computing device requesting access to the second user account so as to use the second user account to perform a shopping activity or other non-banking activity, such as completing a shopping transaction or other non-banking transaction, with a third-party merchant different from a financial institution that may operate client authentication computing platform 110 and/or client portal server 120. For example, the second user account may be an online banking account associated with an online banking portal provided by client portal server 120, and a user may be able to use the online banking account on one or more third-party merchant websites to complete one or more shopping transactions and/or other non-banking transactions with such third-party merchants by authenticating via partner gateway server 130, which may interface with and/or integrate with such third-party merchant websites.

At step 220, partner gateway server 130 may send an authentication request to client authentication computing platform 110. For example, at step 220, partner gateway server 130 may send an authentication request to client authentication computing platform 110 requesting client authentication computing platform 110 to authenticate a user of partner gateway server 130 associated with the login request to a particular user account to which the user of the client portal has requested access (which may, e.g., be the second user account associated with the client portal provided by client portal server 120).

Referring to FIG. 2F, at step 221, client authentication computing platform 110 may receive the authentication request from partner gateway server 130. For example, at step 221, client authentication computing platform 110 may receive, via the communication interface (e.g., communication interface 115), and from a partner gateway server (e.g., partner gateway server 130), a request to authenticate a second user to a second user account associated with the client portal provided by the client portal server (e.g., client portal server 120).

At step 222, client authentication computing platform 110 may identify an activity associated with the authentication request received from partner gateway server 130. For example, at step 222, client authentication computing platform 110 may identify a requested activity associated with the request to authenticate the second user to the second user account as a second activity. For instance, client authentication computing platform 110 may store and/or maintain information defining a plurality of predefined activities that may be performed using one or more user accounts, including the second user account. Such activities may, for instance, include banking activities, shopping activities, lifestyle activities, and/or other activities. In addition, the authentication request received from partner gateway server 130 may include information identifying a requested activity, and client authentication computing platform 110 may accordingly identify a particular activity as being associated with the authentication request received from partner gateway server 130. For instance, in the example illustrated in the example event sequence and discussed in greater detail below, client authentication computing platform 110 may identify a shopping activity or other non-banking activity as being the activity associated with the authentication request received from partner gateway server 130. In some instances, client authentication computing platform 110 may select and use different authentication methods in authenticating a user to a user account depending on the activity for which the user account is to be used (which may, e.g., correspond to the activity identified at step 222), because different activities may require different levels of access to the user account and thus may require relatively higher or lower levels of user account security.

In some embodiments, identifying the requested activity associated with the request to authenticate the second user to the second user account as the second activity may include: generating a second activity selection prompt directing the partner gateway server to prompt the second user to select an activity; sending, to the partner gateway server, the second activity selection prompt directing the partner gateway server to prompt the second user to select an activity; and receiving, from the partner gateway server, second activity selection input selecting the second activity. For example, in identifying the requested activity associated with the request to authenticate the second user to the second user account as the second activity (e.g., at step 222), client authentication computing platform 110 may generate a second activity selection prompt directing the partner gateway server (e.g., partner gateway server 130) to prompt the second user to select an activity. Subsequently, client authentication computing platform 110 may send, to the partner gateway server (e.g., partner gateway server 130), the second activity selection prompt directing the partner gateway server (e.g., partner gateway server 130) to prompt the second user to select an activity. For example, the second activity selection prompt may cause partner gateway server 130 to present one or more graphical user interfaces prompting the second user to select an activity for which the user account is to be used (e.g., a banking activity, a shopping activity, a lifestyle activity, or the like), as client authentication computing platform 110 may select a different authentication method for authenticating the user to the user account depending on the activity that is selected. Thereafter, client authentication computing platform 110 may receive, from the partner gateway server (e.g., partner gateway server 130), second activity selection input selecting the second activity.

In some embodiments, identifying the requested activity associated with the request to authenticate the second user to the second user account as the second activity may include identifying the second activity based on a source of the request to authenticate the second user to the second user account. For example, in identifying the requested activity associated with the request to authenticate the second user to the second user account as the second activity, client authentication computing platform 110 may identify the second activity based on a source of the request to authenticate the second user to the second user account. For instance, client authentication computing platform 110 may determine and/or otherwise identify that the activity associated with the request is a particular activity (e.g., the second activity) based on the request originating from partner gateway server 130 (e.g., as opposed to client portal server 120) or another particular source, such as a particular client computing device.

In some embodiments, the first activity may be associated with a greater level of access to user account information than the second activity. For example, the first activity (which may, e.g., be performed using the first user account, as discussed above) may be associated with a greater level of access to user account information than the second activity (which may, e.g., be performed using the second user account) because performing the first activity may involve providing more access to user account information than performing the second activity. For instance, the first activity may be a banking activity and the second activity may be a shopping activity or other non-banking activity, and so the first activity may be associated with a greater level of access to user account information than the second activity (which may, e.g., result in client authentication computing platform 110 selecting a relatively more secure authentication method when authenticating a user to the first user account to perform the first activity than when authenticating a user to the second user account to perform the second activity).

At step 223, client authentication computing platform 110 may select an authentication method (e.g., based on the activity identified as being associated with the authentication request received from partner gateway server 130). For example, at step 223, based on identifying the requested activity associated with the request to authenticate the second user to the second user account as the second activity, client authentication computing platform 110 may select a single-device authentication method for authenticating the second user to the second user account associated with the client portal provided by the client portal server (e.g., client portal server 120). For instance, in the example illustrated in the example event sequence, client authentication computing platform 110 may have identified a shopping activity or other non-banking activity as being the activity associated with the authentication request received from partner gateway server 130 and accordingly may select a single-device authentication method, such as a single-device one-time passcode authentication method, for authenticating the second user to the second user account associated with the client portal provided by the client portal server (e.g., client portal server 120). For example, performing a shopping activity or other non-banking activity may require relatively less access to the user account than one or more other predefined activities, and so client authentication computing platform 110 may select a relatively less secure authentication method, such as a single-device authentication method, instead of one or more other relatively more secure authentication methods, for authenticating the second user to the second user account associated with the client portal provided by the client portal server (e.g., client portal server 120).

Figure 6:
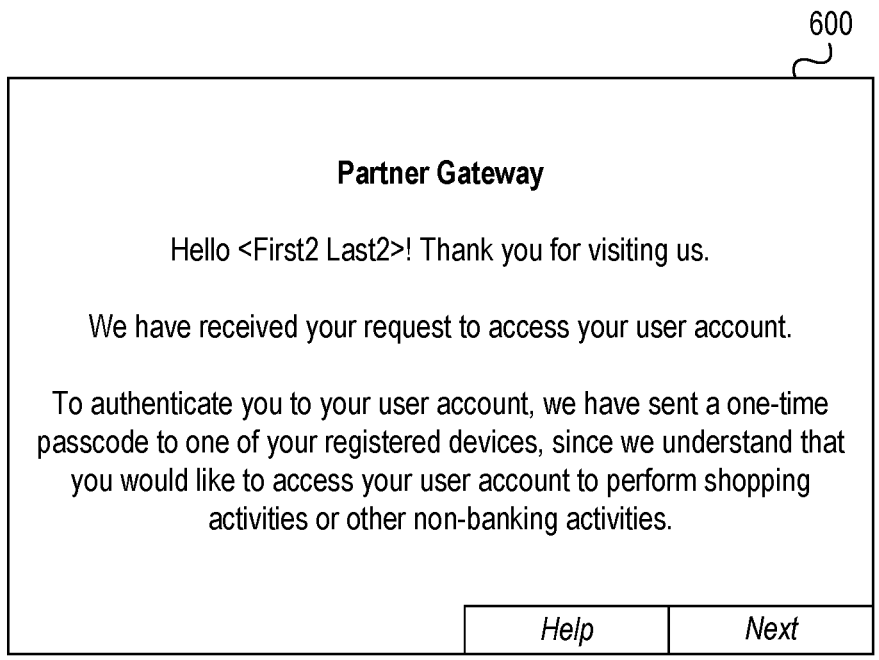

In some instances, after selecting an authentication method (e.g., at step 223), client authentication computing platform 110 may cause partner gateway server 130 to present and/or cause one or more computing devices (e.g., the device being used by the user of partner gateway server 130 to request access to the second user account) to display a graphical user interface similar to graphical user interface 600, which is illustrated in FIG. 6. As seen in FIG. 6, graphical user interface 600 may include information welcoming the user (e.g., "Hello <First2 Last2>! Thank you for visiting us."), indicating that the request to access the user account has been received (e.g., "We have received your request to access your user account"), and informing the user about the authentication method that has been selected (e.g., "To authenticate you to your user account, we have sent a one-time passcode to one of your registered devices, since we understand that you would like to access your user account to perform shopping activities or other non-banking activities.").

At step 224, client authentication computing platform 110 may generate one or more one-time passcodes for one or more registered devices (e.g., based on the authentication method selected at step 223). For example, at step 224, based on selecting the single-device authentication method for authenticating the second user to the second user account associated with the client portal provided by the client portal server (e.g., client portal server 120), client authentication computing platform 110 may generate a third one-time passcode for a third registered device. For instance, in the example illustrated in the example event sequence, based on selecting a single-device one-time passcode authentication method at step 223, client authentication computing platform 110 may generate a third one-time passcode for client computing device 170. Such a one-time passcode may, for example, be generated by client authentication computing platform 110 using one or more random number generator algorithms. In some instances, client authentication computing platform 110 may, for example, generate and/or send one or more biometric prompts and/or other authentication prompts to the registered device (e.g., client computing device 170) instead of and/or in addition to the one-time passcode. In other instances, client authentication computing platform 110 may, for example, skip generating and/or sending a one-time passcode to client computing device 170 and instead might only require the user to provide a username and/or password for validation to authenticate.

Figure 2G:
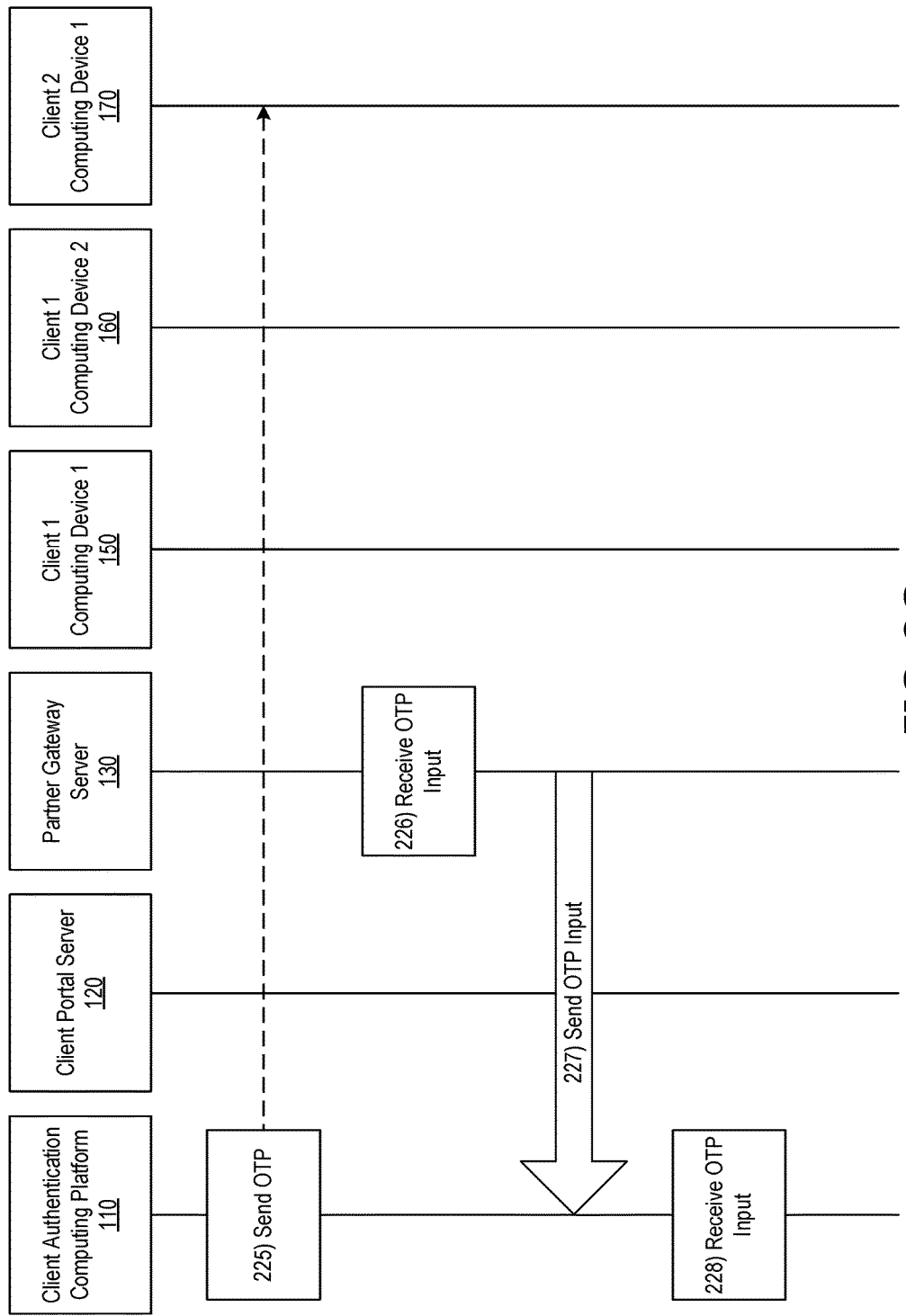

Referring to FIG. 2G, at step 225, client authentication computing platform 110 may send the one or more one-time passcodes to the one or more registered devices. For example, at step 225, client authentication computing platform 110 may send, via the communication interface (e.g., communication interface 115), the third one-time passcode to the third registered device. For instance, client authentication computing platform 110 may send the third one-time passcode to client computing device 170. In some instances, client authentication computing platform 110 may send one or more one-time passcodes to one or more mobile devices (e.g., client computing device 170, client computing device 180) via a push notification server and/or a push notification service (which may, e.g., be associated with an operating system executed by the one or more mobile devices). Additionally or alternatively, the one or more one-time passcodes sent to one or more mobile devices (e.g., client computing device 170, client computing device 180) may, in some instances, be presented by a mobile banking application executed by the one or more mobile devices (e.g., client computing device 170, client computing device 180).

At step 226, partner gateway server 130 may receive one-time passcode input. For example, at step 226, partner gateway server 130 may receive one-time passcode input via one or more user interfaces presented by partner gateway server 130, and such one-time passcode input may include the third one-time passcode generated by client authentication computing platform 110 for the third registered device. For instance, in receiving the one-time passcode input at step 226, partner gateway server 130 may present and/or cause one or more computing devices (e.g., the device being used by the user of partner gateway server 130 to request access to the second user account) to display a graphical user interface similar to graphical user interface 700, which is illustrated in FIG. 7. As seen in FIG. 7, graphical user interface 700 may include information prompting a user to input the one-time passcode sent to the registered device to continue with the authentication process (e.g., "We have sent a one-time passcode to your registered device. Please enter this passcode in the field below to continue"), as well as one or more fields and/or other controls configured to receive such input from the user (e.g., "OTP1: _____"). In some instances, the user interface presented by partner gateway server 130 and/or one or more user interface elements of the user interface presented by partner gateway server 130 may be integrated with and/or incorporated into a web site hosted by a third-party merchant different from the financial institution that may operate client authentication computing platform 110 and/or client portal server 120, and the user may, for instance, authenticate via partner gateway server 130 so as to enable the user to use their online banking account to complete a shopping transaction with the third-party merchant (e.g., via a merchant check-out user interface or website that may integrate with and/or communicate with partner gateway server 130).

At step 227, partner gateway server 130 may send the one-time passcode input to client authentication computing platform 110. At step 228, client authentication computing platform 110 may receive the one-time passcode input from partner gateway server 130. For example, at step 228, client authentication computing platform 110 may receive, via the communication interface (e.g., communication interface 115), and from the partner gateway server (e.g., partner gateway server 130), second one-time passcode input.

Figure 2H:
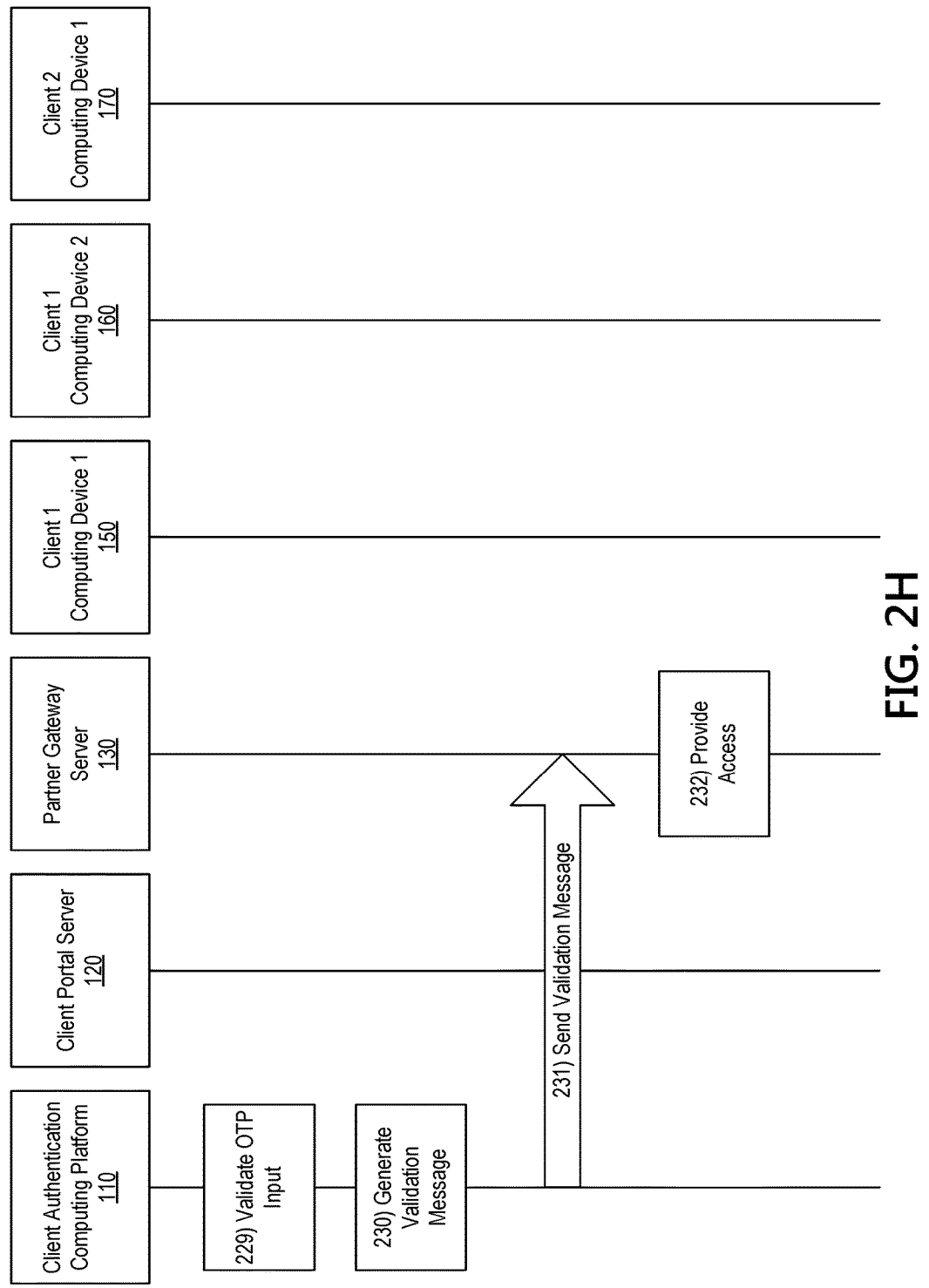

Referring to FIG. 2H, at step 229, client authentication computing platform 110 may validate the one-time passcode input received from partner gateway server 130. For example, at step 229, client authentication computing platform 110 may validate the second one-time passcode input received from the partner gateway server (e.g., partner gateway server 130). In validating the second one-time passcode input, client authentication computing platform 110 may, for example, compare the second one-time passcode input to the third one-time passcode generated by client authentication computing platform 110 for the third registered device to confirm that the second one-time passcode input matches the third one-time passcode generated by client authentication computing platform 110 for the third registered device and is therefore valid. If client authentication computing platform 110 determines that the second one-time passcode input does not match the third one-time passcode generated by client authentication computing platform 110 for the third registered device and is therefore not valid, client authentication computing platform 110 may generate and/or send one or more error messages to partner gateway server 130 and/or one or more other devices. Such error messages may, for instance, cause partner gateway server 130 to prompt the user of partner gateway server 130 requesting access to the second user account to try entering the one-time passcode again, and if the user again provides invalid one-time passcode input, client authentication computing platform 110 may deny access to the second user account and/or the event sequence may end. If the second one-time passcode input is valid, the event sequence may continue as illustrated.

At step 230, client authentication computing platform 110 may generate a validation message. For example, at step 230, based on validating the second one-time passcode input received from the partner gateway server (e.g., partner gateway server 130), client authentication computing platform 110 may generate a second validation message directing the partner gateway server (e.g., partner gateway server 130) to provide the second user with access to the second user account. In some instances, in generating the second validation message directing the client portal server (e.g., client portal server 120) to provide the second user with access to the second user account, client authentication computing platform 110 may embed and/or otherwise include one or more tokens, certificates, and/or keys in the second validation message, and such tokens, certificates, and/or keys may be configured to enable and/or cause partner gateway server 130 to load and/or obtain user account information associated with the second user account from one or more other servers (which may, e.g., be associated with an organization, such as a financial institution, operating client authentication computing platform 110 and/or client portal server 120). For example, client authentication computing platform 110 may embed and/or otherwise include one or more tokens, certificates, and/or keys in the second validation message that enable and/or cause partner gateway server 130 to request, obtain, receive, and/or load financial account information associated with the second user account from one or more financial account management servers, so that partner gateway server 130 may subsequently present such financial account information and/or use such information to allow the user of partner gateway server 130 to complete a transaction with a third-party merchant using the second user account associated with the client portal.

At step 231, client authentication computing platform 110 may send the validation message to partner gateway server 130. For example, at step 231, client authentication computing platform 110 may send, via the communication interface (e.g., communication interface 115), to the partner gateway server (e.g., partner gateway server 130), the second validation message directing the partner gateway server (e.g., partner gateway server 130) to provide the second user with access to the second user account.

At step 232, partner gateway server 130 may provide the second user with access to the second user account (e.g., based on and/or in response to receiving the validation message from client authentication computing platform 110). In providing the second user with access to the second user account, partner gateway server 130 may, in some instances, present and/or cause one or more computing devices (e.g., the device being used by the user of partner gateway server 130 to request access to the second user account) to display a graphical user interface similar to graphical user interface 800, which is illustrated in FIG. 8. As seen in FIG. 8, graphical user interface 800 may include information informing the user that they have been authenticated to the user account (e.g., "Thank you <First2 Last2>! You have been authenticated to your user account. Please select a function below.") and may include information providing the user with one or more options for performing the identified activity using the user account, such as one or more options for performing the shopping activity or other non-banking activity using the user account (e.g., "Complete Shopping Transaction; View Special Offers; Check Order History; More . . . "). Additionally or alternatively, in providing the second user with access to the second user account, partner gateway server 130 may allow the user of partner gateway server 130 to complete a transaction with a third-party merchant using the second user account.

In one or more alternative arrangements, instead of or in addition to sending a one-time passcode to the third registered device, client authentication computing platform 110 may send one or more biometric authentication prompts and/or other authentication prompts to the third registered device. For example, in performing the example sequence of events discussed above in authenticating the second user to the second user account, client authentication computing platform 110 may additionally or alternatively generate and/or send one or more biometric authentication prompts and/or other authentication prompts to one or more registered devices associated with the second user account (e.g., client computing device 170, client computing device 180). Such biometric authentication prompts may, for instance, prompt a recipient device and/or a user of such a recipient device to provide biometric input (e.g., fingerprint biometric input, voiceprint biometric input, facial scan biometric input, retinal scan biometric input, and/or other biometric input) for validation by the recipient device and/or by client authentication computing platform 110.

Figure 9:
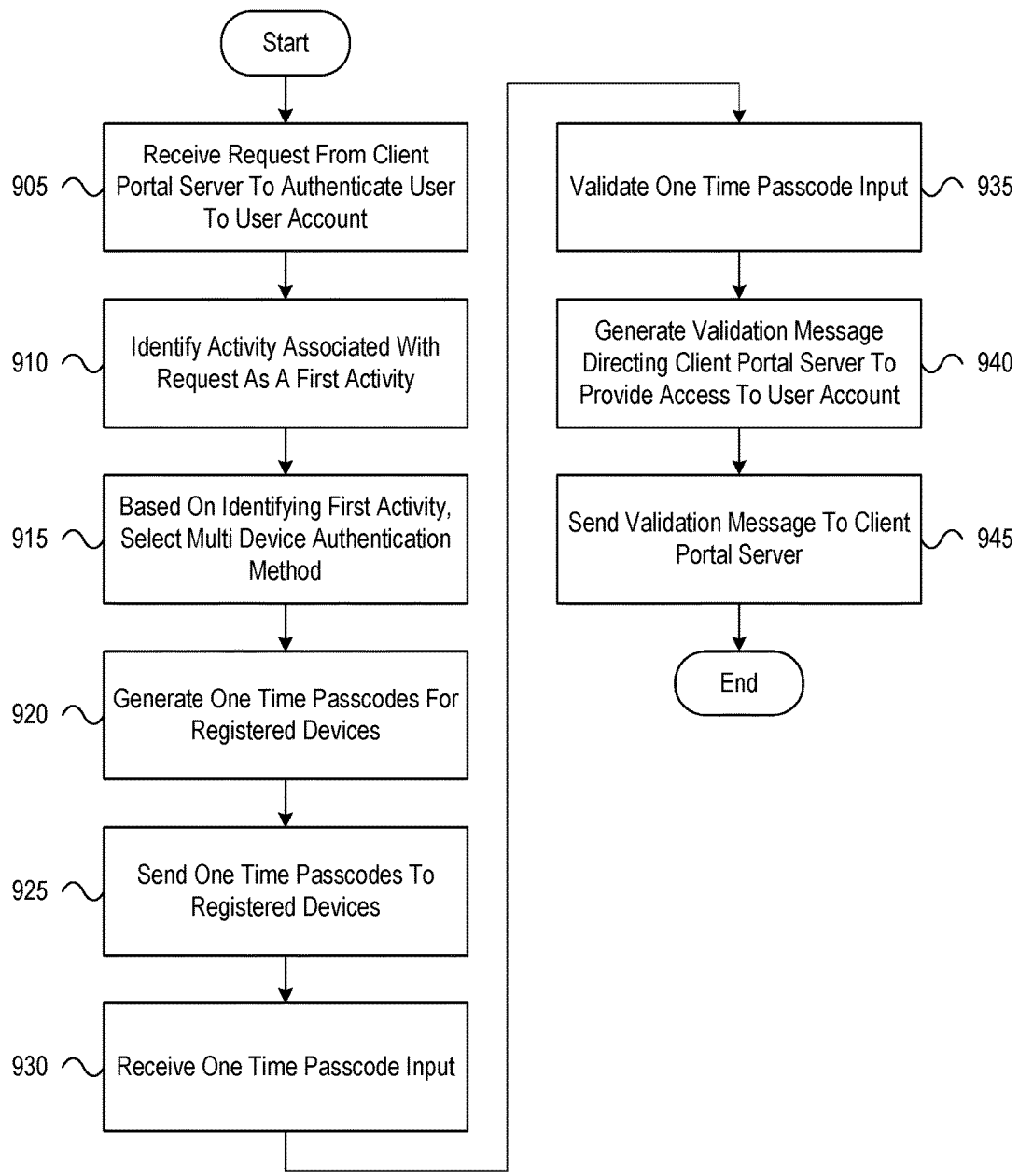
FIG. 9 depicts an illustrative method for preventing unauthorized access to secured information systems using multi-device authentication techniques in accordance with one or more example embodiments.

FIG. 9 depicts an illustrative method for preventing unauthorized access to secured information systems using multi-device authentication techniques in accordance with one or more example embodiments. Referring to FIG. 9, at step 905, a computing platform having at least one processor, a memory, and a communication interface may receive, via the communication interface, and from a client portal server, a request to authenticate a first user to a first user account associated with a client portal provided by the client portal server. At step 910, the computing platform may identify a requested activity associated with the request to authenticate the first user to the first user account as a first activity. At step 915, based on identifying the requested activity associated with the request to authenticate the first user to the first user account as the first activity, the computing platform may select a multi-device authentication method for authenticating the first user to the first user account associated with the client portal provided by the client portal server. At step 920, based on selecting the multi-device authentication method for authenticating the first user to the first user account associated with the client portal provided by the client portal server, the computing platform may generate a first one-time passcode for a first registered device and a second one-time passcode for a second registered device. At step 925, the computing platform may send, via the communication interface, the first one-time passcode to the first registered device and the second one-time passcode to the second registered device. At step 930, the computing platform may receive, via the communication interface, and from the client portal server, first one-time passcode input. At step 935, the computing platform may validate the first one-time passcode input received from the client portal server. At step 940, based on validating the first one-time passcode input received from the client portal server, the computing platform may generate a first validation message directing the client portal server to provide the first user with access to the first user account. At step 945, the computing platform may send, via the communication interface, to the client portal server, the first validation message directing the client portal server to provide the first user with access to the first user account.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, and from a client portal server, a request to authenticate a first user to a first user account corresponding to a client portal provided by the client portal server;
   identify a requested activity corresponding to the request to authenticate the first user to the first user account as a first activity;
   based on identifying the requested activity corresponding to the request to authenticate the first user to the first user account as the first activity, select a multi-device authentication method for authenticating the first user to the first user account corresponding to the client portal provided by the client portal server;
   based on selecting the multi-device authentication method for authenticating the first user to the first user account corresponding to the client portal provided by the client portal server, generate a first one-time passcode for a first registered device and a second one-time passcode for a second registered device different from the first registered device, wherein the first one-time passcode is different from the second one-time passcode;

send, via the communication interface, the first one-time passcode to the first registered device and the second one-time passcode to the second registered device;

receive, via the communication interface, and from the client portal server, first one-time passcode input;

validate the first one-time passcode input received from the client portal server;

based on validating the first one-time passcode input received from the client portal server, generate a first validation message directing the client portal server to provide the first user with access to the first user account; and send, via the communication interface, to the client portal server, the first validation message directing the client portal server to provide the first user with access to the first user account.

2. The computing platform of claim 1, wherein the memory stores additional computer-readable instructions that, when executed by the at least one processor, cause the computing platform to:

prior to receiving the request to authenticate the first user to the first user account associated corresponding to the client portal provided by the client portal server:

receive first device registration information for the first user account corresponding to the client portal provided by the client portal server; and store the first device registration information for the first user account corresponding to the client portal provided by the client portal server, wherein the first device registration information identifies the first registered device and the second registered device as authorized passcode recipients for the first user account corresponding to the client portal provided by the client portal server.

3. The computing platform of claim 1, wherein identifying the requested activity corresponding to the request to authenticate the first user to the first user account as the first activity comprises:

generating a first activity selection prompt directing the client portal server to prompt the first user to select an activity;

sending, to the client portal server, the first activity selection prompt directing the client portal server to prompt the first user to select an activity; and receiving, from the client portal server, first activity selection input selecting the first activity.

4. The computing platform of claim 1, wherein identifying the requested activity corresponding to the request to authenticate the first user to the first user account as the first activity comprises identifying the first activity based on a source of the request to authenticate the first user to the first user account.

5. The computing platform of claim 1, wherein the memory stores additional computer-readable instructions that, when executed by the at least one processor, cause the computing platform to:

receive, via the communication interface, and from a partner gateway server, a request to authenticate a second user to a second user account corresponding to the client portal provided by the client portal server;

identify a requested activity corresponding to the request to authenticate the second user to the second user account as a second activity;

based on identifying the requested activity corresponding to the request to authenticate the second user to the second user account as the second activity, select a single-device authentication method for authenticating the second user to the second user account corresponding to the client portal provided by the client portal server;

based on selecting the single-device authentication method for authenticating the second user to the second user account corresponding to the client portal provided by the client portal server, generate a third one-time passcode for a third registered device;

send, via the communication interface, the third one-time passcode to the third registered device;

receive, via the communication interface, and from the partner gateway server, second one-time passcode input;

validate the second one-time passcode input received from the partner gateway server;

based on validating the second one-time passcode input received from the partner gateway server, generate a second validation message directing the partner gateway server to provide the second user with access to the second user account; and send, via the communication interface, to the partner gateway server, the second validation message directing the partner gateway server to provide the second user with access to the second user account.

6. The computing platform of claim 5, wherein the memory stores additional computer-readable instructions that, when executed by the at least one processor, cause the computing platform to:

prior to receiving the request to authenticate the second user to the second user account corresponding to the client portal provided by the client portal server:

receive second device registration information for the second user account corresponding to the client portal provided by the client portal server; and store the second device registration information for the second user account corresponding to the client portal provided by the client portal server, wherein the second device registration information identifies the third registered device as an authorized passcode recipient for the second user account corresponding to the client portal provided by the client portal server.

7. The computing platform of claim 5, wherein identifying the requested activity corresponding to the request to authenticate the second user to the second user account as the second activity comprises:

generating a second activity selection prompt directing the partner gateway server to prompt the second user to select an activity;

sending, to the partner gateway server, the second activity selection prompt directing the partner gateway server to prompt the second user to select an activity; and receiving, from the partner gateway server, second activity selection input selecting the second activity.

8. The computing platform of claim 5, wherein identifying the requested activity corresponding to the request to authenticate the second user to the second user account as the second activity comprises identifying the second activity based on a source of the request to authenticate the second user to the second user account.

9. The computing platform of claim 5, wherein the first activity corresponds to a greater level of access to user account information than the second activity.

10. The computing platform of claim 1, wherein validating the first one-time passcode input received from the client portal server comprises comparing the first one-time passcode input received from the client portal server to the first one-time passcode sent to the first registered device and the second one-time passcode sent to the second registered device to confirm that the first one-time passcode input received from the client portal server matches the first one-time passcode sent to the first registered device and the second one-time passcode sent to the second registered device.

11. A method, comprising:
at a computing platform comprising at least one processor, memory, and a communication interface:
receiving, by the at least one processor, via the communication interface, and from a client portal server, a request to authenticate a first user to a first user account corresponding to a client portal provided by the client portal server;
identifying, by the at least one processor, a requested activity corresponding to the request to authenticate the first user to the first user account as a first activity;
based on identifying the requested activity corresponding to the request to authenticate the first user to the first user account as the first activity, selecting, by the at least one processor, a multi-device authentication method for authenticating the first user to the first user account corresponding to the client portal provided by the client portal server;
based on selecting the multi-device authentication method for authenticating the first user to the first user account corresponding to the client portal provided by the client portal server, generating, by the at least one processor, a first one-time passcode for a first registered device and a second one-time passcode for a second registered device different from the first registered device, wherein the first one-time passcode is different from the second one-time passcode;
sending, by the at least one processor, via the communication interface, the first one-time passcode to the first registered device and the second one-time passcode to the second registered device;
receiving, by the at least one processor, via the communication interface, and from the client portal server, first one-time passcode input;
validating, by the at least one processor, the first one-time passcode input received from the client portal server;
based on validating the first one-time passcode input received from the client portal server, generating, by the at least one processor, a first validation message directing the client portal server to provide the first user with access to the first user account; and
sending, by the at least one processor, via the communication interface, to the client portal server, the first validation message directing the client portal server to provide the first user with access to the first user account.

12. The method of claim 11, comprising:
prior to receiving the request to authenticate the first user to the first user account corresponding to the client portal provided by the client portal server:
receiving, by the at least one processor, first device registration information for the first user account corresponding to the client portal provided by the client portal server; and
storing, by the at least one processor, the first device registration information for the first user account corresponding to the client portal provided by the client portal server,
wherein the first device registration information identifies the first registered device and the second registered device as authorized passcode recipients for the first user account corresponding to the client portal provided by the client portal server.

13. The method of claim 11, wherein identifying the requested activity corresponding to the request to authenticate the first user to the first user account as the first activity comprises:
generating a first activity selection prompt directing the client portal server to prompt the first user to select an activity;
sending, to the client portal server, the first activity selection prompt directing the client portal server to prompt the first user to select an activity; and
receiving, from the client portal server, first activity selection input selecting the first activity.

14. The method of claim 11, wherein identifying the requested activity corresponding to the request to authenticate the first user to the first user account as the first activity comprises identifying the first activity based on a source of the request to authenticate the first user to the first user account.

15. The method of claim 11, comprising:
receiving, by the at least one processor, via the communication interface, and from a partner gateway server, a request to authenticate a second user to a second user account corresponding to the client portal provided by the client portal server;
identifying, by the at least one processor, a requested activity corresponding to the request to authenticate the second user to the second user account as a second activity;
based on identifying the requested activity corresponding to the request to authenticate the second user to the second user account as the second activity, selecting, by the at least one processor, a single-device authentication method for authenticating the second user to the second user account corresponding to the client portal provided by the client portal server;
based on selecting the single-device authentication method for authenticating the second user to the second user account corresponding to the client portal provided by the client portal server, generating, by the at least one processor, a third one-time passcode for a third registered device;
sending, by the at least one processor, via the communication interface, the third one-time passcode to the third registered device;
receiving, by the at least one processor, via the communication interface, and from the partner gateway server, second one-time passcode input;
validating, by the at least one processor, the second one-time passcode input received from the partner gateway server;
based on validating the second one-time passcode input received from the partner gateway server, generating, by the at least one processor, a second validation message directing the partner gateway server to provide the second user with access to the second user account; and sending, by the at least one processor, via the communication interface, to the partner gateway server, the second validation message directing the partner gateway server to provide the second user with access to the second user account.

16. The method of claim 15, comprising:

prior to receiving the request to authenticate the second user to the second user account corresponding to the client portal provided by the client portal server:

receiving, by the at least one processor, second device registration information for the second user account corresponding to the client portal provided by the client portal server; and storing, by the at least one processor, the second device registration information for the second user account corresponding to the client portal provided by the client portal server, wherein the second device registration information identifies the third registered device as an authorized passcode recipient for the second user account corresponding to the client portal provided by the client portal server.

17. The method of claim 15, wherein identifying the requested activity corresponding to the request to authenticate the second user to the second user account as the second activity comprises:

generating a second activity selection prompt directing the partner gateway server to prompt the second user to select an activity;

sending, to the partner gateway server, the second activity selection prompt directing the partner gateway server to prompt the second user to select an activity; and receiving, from the partner gateway server, second activity selection input selecting the second activity.

18. The method of claim 15, wherein identifying the requested activity corresponding to the request to authenticate the second user to the second user account as the second activity comprises identifying the second activity based on a source of the request to authenticate the second user to the second user account.

19. The method of claim 15, wherein the first activity is corresponds to a greater level of access to user account information than the second activity.

20. One or more non-transitory computer-readable media storing instructions that, when executed by a computing platform comprising at least one processor, memory, and a communication interface, cause the computing platform to:

receive, via the communication interface, and from a client portal server, a request to authenticate a first user to a first user account corresponding to a client portal provided by the client portal server;

identify a requested activity corresponding to the request to authenticate the first user to the first user account as a first activity;

based on identifying the requested activity corresponding to the request to authenticate the first user to the first user account as the first activity, select a multi-device authentication method for authenticating the first user to the first user account corresponding to the client portal provided by the client portal server;

based on selecting the multi-device authentication method for authenticating the first user to the first user account corresponding to the client portal provided by the client portal server, generate a first one-time passcode for a first registered device and a second one-time passcode for a second registered device different from the first registered device, wherein the first one-time passcode is different from the second one-time passcode;

send, via the communication interface, the first one-time passcode to the first registered device and the second one-time passcode to the second registered device;

receive, via the communication interface, and from the client portal server, first one-time passcode input;

validate the first one-time passcode input received from the client portal server;

based on validating the first one-time passcode input received from the client portal server, generate a first validation message directing the client portal server to provide the first user with access to the first user account; and send, via the communication interface, to the client portal server, the first validation message directing the client portal server to provide the first user with access to the first user account.

* * * * *